US012431635B2

(12) United States Patent
Yun et al.

(10) Patent No.: US 12,431,635 B2
(45) Date of Patent: Sep. 30, 2025

(54) ELECTRONIC DEVICE INCLUDING ANTENNA

(71) Applicant: SAMSUNG ELECTRONICS CO., LTD., Suwon-si (KR)

(72) Inventors: Sumin Yun, Suwon-si (KR); Hosaeng Kim, Suwon-si (KR); Seongjin Park, Suwon-si (KR); Woomin Jang, Suwon-si (KR); Jehun Jong, Suwon-si (KR); Jaehoon Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 280 days.

(21) Appl. No.: 18/118,422

(22) Filed: Mar. 7, 2023

(65) Prior Publication Data

US 2023/0216213 A1 Jul. 6, 2023

Related U.S. Application Data

(63) Continuation of application No. PCT/KR2022/014532, filed on Sep. 28, 2022.

(30) Foreign Application Priority Data

Oct. 12, 2021 (KR) ........................ 10-2021-0135114

(51) Int. Cl.
*H01Q 21/06* (2006.01)
*H01Q 1/22* (2006.01)
(Continued)

(52) U.S. Cl.
CPC ......... *H01Q 21/065* (2013.01); *H01Q 1/2283* (2013.01); *H01Q 1/521* (2013.01); *H01Q 5/321* (2015.01); *H01Q 9/0414* (2013.01)

(58) Field of Classification Search
CPC ...... H01Q 1/2283; H01Q 1/243; H01Q 1/521; H01Q 3/36; H01Q 5/321; H01Q 9/0407; H01Q 9/0414; H01Q 21/065
See application file for complete search history.

(56) References Cited

U.S. PATENT DOCUMENTS 10,027,028 B2 7/2018 Wang et al.
10,411,349 B2 9/2019 Black et al.
(Continued)

FOREIGN PATENT DOCUMENTS

KR 10-2018-0087095 8/2018
KR 10-2021-0026334 3/2021
(Continued)

OTHER PUBLICATIONS

International Search Report for PCT/KR2022/014532 mailed Jan. 10, 2023, 6 pages.
(Continued)

*Primary Examiner* — Daniel Munoz
(74) *Attorney, Agent, or Firm* — Nixon & Vanderhye, P.C.

(57) ABSTRACT

An example electronic device may include an antenna module including a printed circuit board, a plurality of conductive patches including a first conductive patch and a second conductive patch, an RFIC which is disposed on the second surface of the printed circuit board and includes a first tuning circuit, and a first conductive structure which includes a first portion extending from the first conductive patch, a second portion extending from the second conductive patch and connected to the first portion at a point positioned at one end of the first portion, and a first common portion connected to the first tuning circuit and connecting the first conductive patch and the second conductive patch to the first tuning circuit, a ground, and a wireless communication circuit, and the wireless communication circuit may
(Continued)

be configured to feed the plurality of conductive patches to receive a signal in a designated frequency band.

20 Claims, 16 Drawing Sheets

(51) Int. Cl.
*H01Q 1/52* (2006.01)
*H01Q 5/321* (2015.01)
*H01Q 9/04* (2006.01)

(56) References Cited

U.S. PATENT DOCUMENTS 10,498,012 B2 12/2019 Judkins et al.
10,530,064 B2 1/2020 Desclos et al.
10,707,556 B2 7/2020 Kim et al.
11,205,835 B2 12/2021 Kim
2020/0161749 A1 5/2020 Onaka et al.
2020/0194869 A1* 6/2020 Arai ........................ H01P 1/047
2020/0243948 A1* 7/2020 Kim ....................... H01Q 5/385
2020/0274241 A1 8/2020 Onaka et al.
2020/0395660 A1 12/2020 Kuroda et al.
2021/0005955 A1 1/2021 Sudo et al.
2021/0066788 A1 3/2021 Kim
2021/0066813 A1* 3/2021 Salman .................. H01Q 5/371
2022/0328978 A1 10/2022 Sudo et al.
2023/0079082 A1* 3/2023 Lim ....................... H01Q 21/08
343/702
2023/0079358 A1 3/2023 Woo

FOREIGN PATENT DOCUMENTS

KR 10-2022-0141013 10/2022
WO 2019/116756 6/2019
WO 2021/131284 7/2021
WO 2021/157751 8/2021

OTHER PUBLICATIONS

Written Opinion of the ISA for PCT/KR2022/014532 mailed Jan. 10, 2023, 4 pages.
Extended Search Report dated Nov. 11, 2024 in European Patent Application No. 22881258.2.

* cited by examiner

ELECTRONIC DEVICE INCLUDING ANTENNA

CROSS-REFERENCE TO RELATED APPLICATIONS

This application is a continuation of International Application No. PCT/KR2022/014532 designating the United States, filed on Sep. 28, 2022, in the Korean Intellectual Property Receiving Office and claiming priority to Korean Patent Application No. 10-2021-0135114, filed on Oct. 12, 2021, in the Korean Intellectual Property Office, the disclosures of each of which are incorporated by reference herein in their entireties.

BACKGROUND

Field

The disclosure relates to an electronic device including an antenna.

Description of Related Art

In line with development of communication devices, electronic devices may include antenna modules capable of fast large-capacity transmission in order to produce and transmit various contents, to make Internet connections with various things (for example, Internet of things (IoT)), or to make communication connections between various sensors for autonomous driving. For example, electronic devices may include antenna modules for radiating mmWave signals (hereinafter, referred to as mmWave antenna modules).

An array antenna technology may be applied to mmWave antenna modules supporting 5G (new radio) communication such that, in order to minimize transmission loss, a plurality of conductive patches are utilized.

SUMMARY

When an antenna module includes a plurality of conductive patches, a radio frequency integrated circuit (RFIC) may need to include elements (for example, power amplifier (PA), low noise amplifier (LNA)) corresponding to respective conductive patches, and may need to include a plurality of tuning circuits for adjusting frequency bands transmitted and/or received by respective conductive patches. When the RFIC includes a plurality of tuning circuits corresponding to all conductive patches, the size of the RFIC and that of the antenna module may increase.

According to various embodiments disclosed herein, an antenna module may include a conductive structure connecting a plurality of conductive patches and a tuning circuit through a common part.

An electronic device according to various embodiments disclosed herein may include an antenna module including a printed circuit board including a first surface and a second surface opposite to the first surface, a plurality of conductive patches disposed on the first surface of the printed circuit board, the plurality of conductive patches including a first conductive patch and a second conductive patch, a radio frequency integrated circuit (RFIC) disposed on the second surface of the printed circuit board, the RFIC including a first tuning circuit, and a first conductive structure configured to connect the first conductive patch and the second conductive patch to the first tuning circuit, the first conductive structure including a first portion configured to extend from a first point of the first conductive patch, a second portion configured to extend from a second point of the second conductive patch and connected to the first portion at a third point positioned at one end of the first portion, and a first common portion configured to extend from the third point and connected to the first tuning circuit, a ground electrically connected to the first tuning circuit, and a wireless communication circuit electrically connected to the plurality of conductive patches, wherein the wireless communication circuit is configured to feed the plurality of conductive patches to transmit and/or receive a signal in a designated frequency band.

An antenna module according to various embodiments disclosed herein may include a printed circuit board including a first surface and a second surface opposite to the first surface, the printed circuit board including a ground, a plurality of conductive patches disposed on the first surface of the printed circuit board, the plurality of conductive patches including a first conductive patch and a second conductive patch, a radio frequency integrated circuit (RFIC) disposed on the second surface of the printed circuit board, the RFIC including a first tuning circuit, a first conductive structure configured to connect the first tuning circuit and the plurality of conductive patches, the first conductive structure including a first portion configured to extend from a first point of the first conductive patch, a second portion configured to extend from a second point of the second conductive patch and connected to one end of the first portion, and a first common portion configured to extend from a third point at which the first portion and the second portion are connected and connected to the first tuning circuit, and a wireless communication circuit electrically connected to the plurality of conductive patches and disposed on the second surface of the printed circuit board, wherein the first tuning circuit is electrically connected to the ground of the printed circuit board, and the wireless communication circuit is configured to feed the plurality of conductive patches to transmit and/or receive a signal in a designated frequency band.

An electronic device according to various embodiments disclosed herein may include an antenna module including a printed circuit board including a first surface and a second surface opposite to the first surface, a plurality of conductive patches disposed on the first surface of the printed circuit board, the plurality of conductive patches including a first conductive patch and a second conductive patch, a radio frequency integrated circuit (RFIC) disposed on the second surface of the printed circuit board, the RFIC including a tuning circuit, and a conductive structure configured to connect the plurality of conductive patches and the tuning circuit, the conductive structure including a switch circuit including a first port, a second port, and a third port, a first portion configured to extend from the first conductive patch and connected to the first port of the switch circuit, a second portion configured to extend from the second conductive patch and connected to the second port of the switch circuit, and a common portion configured to connect the third port of the switch circuit and the tuning circuit, a ground electrically connected to the tuning circuit, and a wireless communication circuit electrically connected to the plurality of conductive patches, wherein the wireless communication circuit is configured to feed the plurality of conductive patches to transmit and/or receive a signal in a designated frequency band.

According to various embodiments disclosed herein, an electronic device may include at least one tuning circuit connected commonly to a plurality of conductive patches, thereby providing a compact RFIC, and securing a mounting space inside the electronic device.

Various other advantageous effects identified explicitly or implicitly through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, same or similar reference numerals will be used to refer to same or similar elements.

DETAILED DESCRIPTION

Hereinafter, various embodiments of the disclosure will be described with reference to the accompanying drawings. However, it should be understood that there is no intent to limit a specific embodiment of the disclosure, and the disclosure should be construed to include various modifications, equivalents, and/or alternatives of the embodiments of the disclosure.

Figure 1:
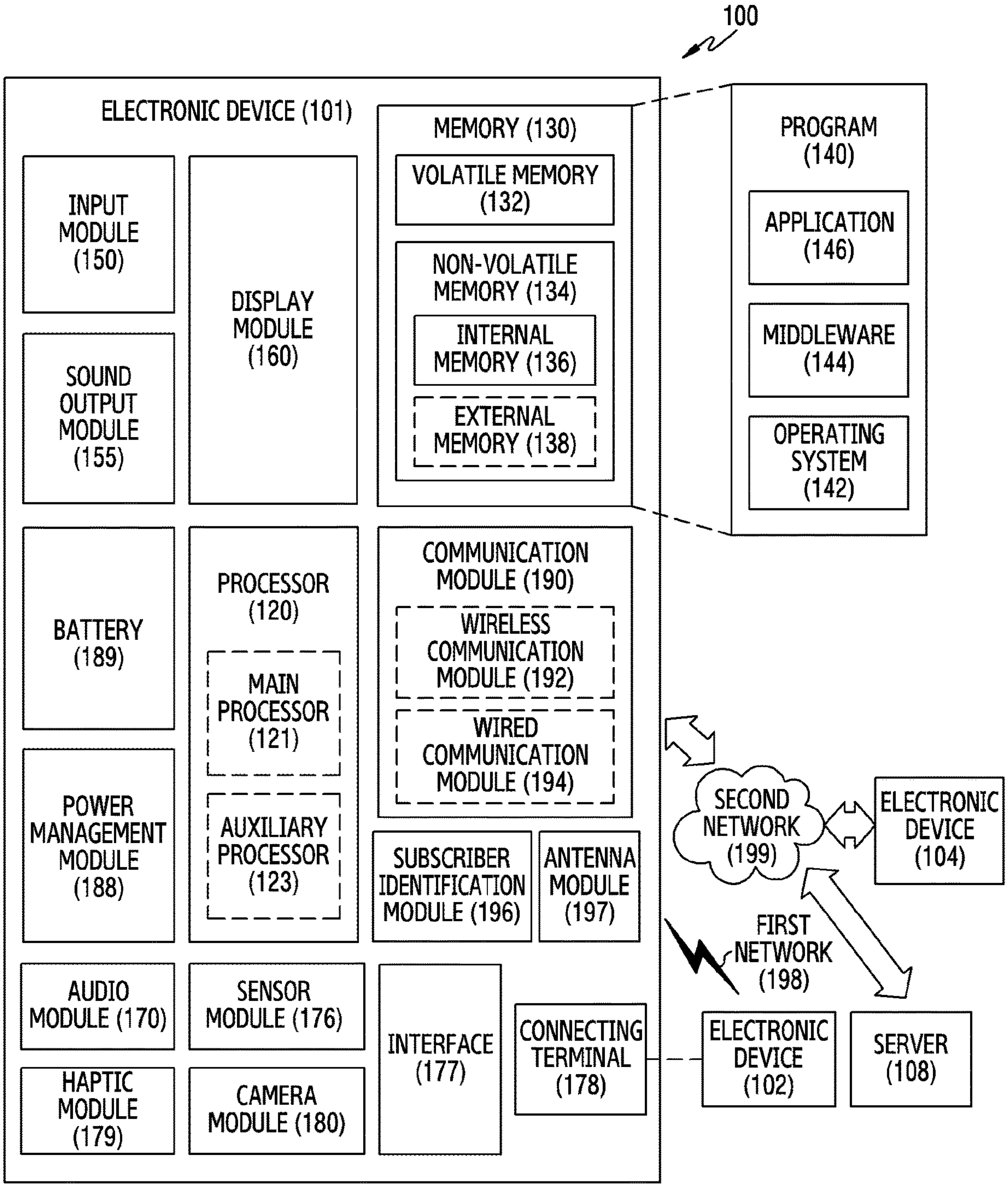
FIG. 1 is a view showing an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
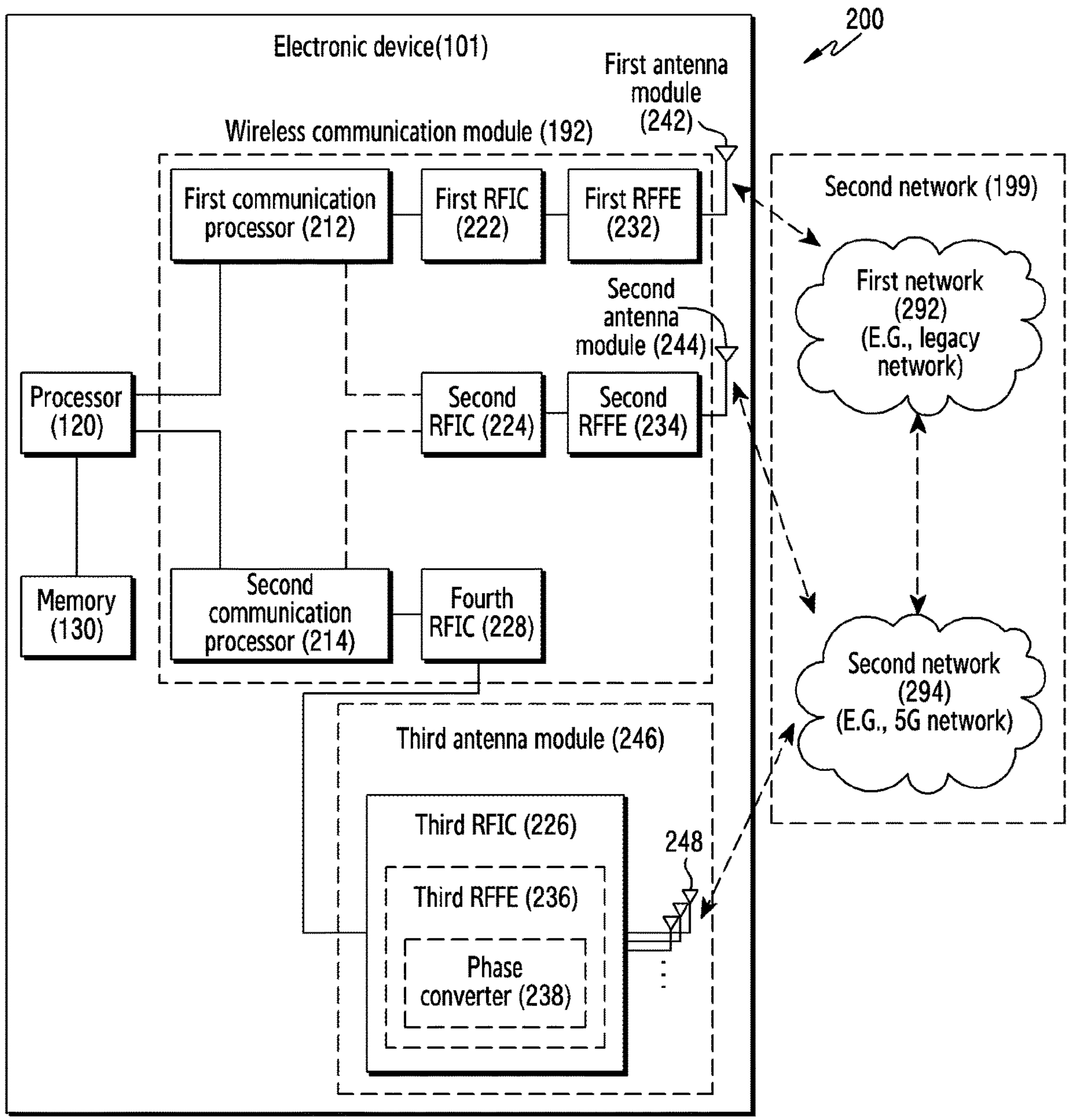
FIG. 2 is a block diagram of an example electronic device for supporting legacy network communication and 5G network communication according to various embodiments.

FIG. 2 is a block diagram 200 illustrating an example electronic device 101 in a network environment including a plurality of cellular networks according to various embodiments.

Referring to FIG. 2, an electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 and a second cellular network 294. According to an embodiment, the electronic device may further include at least one of the parts shown in FIG. 1 and the second network 199 may further include at least one another network. According to an embodiment, the first communication processor 212, the second communication processor 214, the first RFIC 222, the second RFIC 224, the fourth RFIC 228, the first RFFE 232, and the second RFFE 234 may form at least a portion of a wireless communication module 192. According to an embodiment, the fourth RFIC 228 may be omitted or may be included as a portion of the third RFIC 226.

The first communication processor 212 can support establishment of a communication channel with a band to be used for wireless communication with the first cellular network 292 and legacy network communication through the established communication channel. According to various embodiments, the first cellular network may be a legacy network including a 2G, 3G, 4G, or Long-Term Evolution (LTE) network. The second communication processor 214 can support establishment of a communication channel corresponding to a designated band (e.g., about 6 GHz-~about 60 GHz) of a band to be used for wireless communication with the second cellular network 294 and 5G network communication through the established communication channel According to various embodiments, the second cellular network 294 may be a 5G network that is defined in 3GPP. Further, according to an embodiment, the first communication processor 212 or the second communication processor 214 can support establishment of a communication channel corresponding to another designated band (e.g., about 6 GHz or less) of a band to be used for wireless communication with the second cellular network 294 and 5G network communication through the established communication channel. According to an embodiment, the first communication processor 212 and the second communication processor 214 may be implemented in a single chip or a single package. According to various embodiments, the first communication processor 212 or the second communication processor 214 may be disposed in a single chip or a single package together with the processor 120, the auxiliary processor 123, or the communication module 190.

The first RFIC 222, in transmission, can convert a baseband signal generated by the first communication processor 212 into a radio frequency (RF) signal of about 700 MHz to about 3 GHz that is used for the first cellular network 292 (e.g., a legacy network). In reception, an RF signal can be obtained from the first cellular network 292 (e.g., a legacy network) through an antenna (e.g., the first antenna module 242) and can be preprocessed through an RFFE (e.g., the first RFFE 232). The first RFIC 222 can covert the preprocessed RF signal into a baseband signal so that the preprocessed RF signal can be processed by the first communication processor 212.

The second RFIC 224 can convert a baseband signal generated by the first communication processor 212 or the second communication processor 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal can be obtained from the second cellular network 294 (e.g., a 5G network) through an antenna (e.g., the second antenna module 244) and can be preprocessed through an RFFE (e.g., the second RFFE 234). The second RFIC 224 can convert the processed 5G Sub6 RF signal into a baseband signal so that the processed 5G Sub6 RF signal can be processed by a corresponding communication processor of the first communication processor 212 or the second communication processor 214.

The third RFIC 226 can convert a baseband signal generated by the second communication processor 214 into an RF signal in a 5G Above6 band (e.g., about 6 GHz~about 60 GHz) (hereafter, 5G Above6 RF signal) that is used for the second cellular network 294 (e.g., a 5G network). In reception, a 5G Above6 RF signal can be obtained from the second cellular network 294 (e.g., a 5G network) through an antenna (e.g., the antenna 248) and can be preprocessed through the third RFFE 236. The third RFIC 226 can covert the preprocessed 5G Above6 RF signal into a baseband signal so that the preprocessed 5G Above6 RF signal can be processed by the first communication processor 214. According to an embodiment, the third RFFE 236 may be provided as a portion of the third RFIC 226.

The electronic device 101, according to an embodiment, may include a fourth RFIC 228 separately from or as at least a portion of the third RFIC 226. In this case, the fourth RFIC 228 can convert a baseband signal generated by the second communication processor 214 into an RF signal in an intermediate frequency band (e.g., about 9 GHz~about 11 GHz) (hereafter, IF signal), and then transmit the IF signal to the third RFIC 226. The third RFIC 226 can convert the IF signal into a 5G Above6 RF signal. In reception, a 5G Above6 RF signal can be received from the second cellular network 294 (e.g., a 5G network) through an antenna (e.g., the antenna 248) and can be converted into an IF signal by the third RFIC 226. The fourth RFIC 228 can covert the IF signal into a baseband signal so that IF signal can be processed by the second communication processor 214.

According to an embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one of the first antenna module 242 or the second antenna module 244 may be omitted, or may be combined with another antenna module and can process RF signals in a plurality of bands.

According to an embodiment, the third RFIC 226 and the antenna 248 may be disposed on a substrate, thereby being able to form a third antenna module 246. For example, the wireless communication module 192 or the processor 120 may be disposed on a first substrate (e.g., a main PCB). In this case, the third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween. Accordingly, it is possible to reduce a loss (e.g., attenuation) of a signal in a high-frequency band (e.g., about 6 GHz~about 60 GHz), for example, which is used for 5G network communication, due to a transmission line. Accordingly, the electronic device 101 can improve the quality and the speed of communication with the second cellular network 294 (e.g., 5G network).

According to an embodiment, the antenna 248 may be an antenna array including a plurality of antenna elements that can be used for beamforming. In this case, the third RFIC 226, for example, as a portion of the third RFFE 236, may include a plurality of phase shifters 238 corresponding to the antenna elements. In transmission, the phase shifters 238 can convert the phase of a 5G Above6 RF signal to be transmitted to the outside of the electronic device 101 (e.g., to a base station of a 5G network) through the respectively corresponding antenna elements. In reception, the phase shifters 238 can convert the phase of a 5G Above6 RF signal received from the outside through the respectively corresponding antenna element into the same or substantially the same phase. This enables transmission or reception through beamforming between the electronic device 101 and the outside.

The second cellular network 294 (e.g., a 5G network) may be operated independently from (e.g., Stand-Along (SA)) or connected and operated with (e.g., Non-Stand Along (NSA)) the first cellular network 292 (e.g., a legacy network). For example, there may be only an access network (e.g., a 5G radio access network (RAN) or a next generation RAN (NG RAN)) and there is no core network (e.g., a next generation core (NGC)) in a 5G network. In this case, the electronic device 101 can access the access network of the 5G network and then can access an external network (e.g., the internal under control by the core network (e.g., an evolved packed core (EPC)) of the legacy network. Protocol information (e.g., LTE protocol information) for communication with a legacy network or protocol information (e.g., New Radio (NR) protocol information) for communication with a 5G network may be stored in the memory 230 and accessed by another part (e.g., the processor 120, the first communication processor 212, or the second communication processor 214).

Figure 3A:
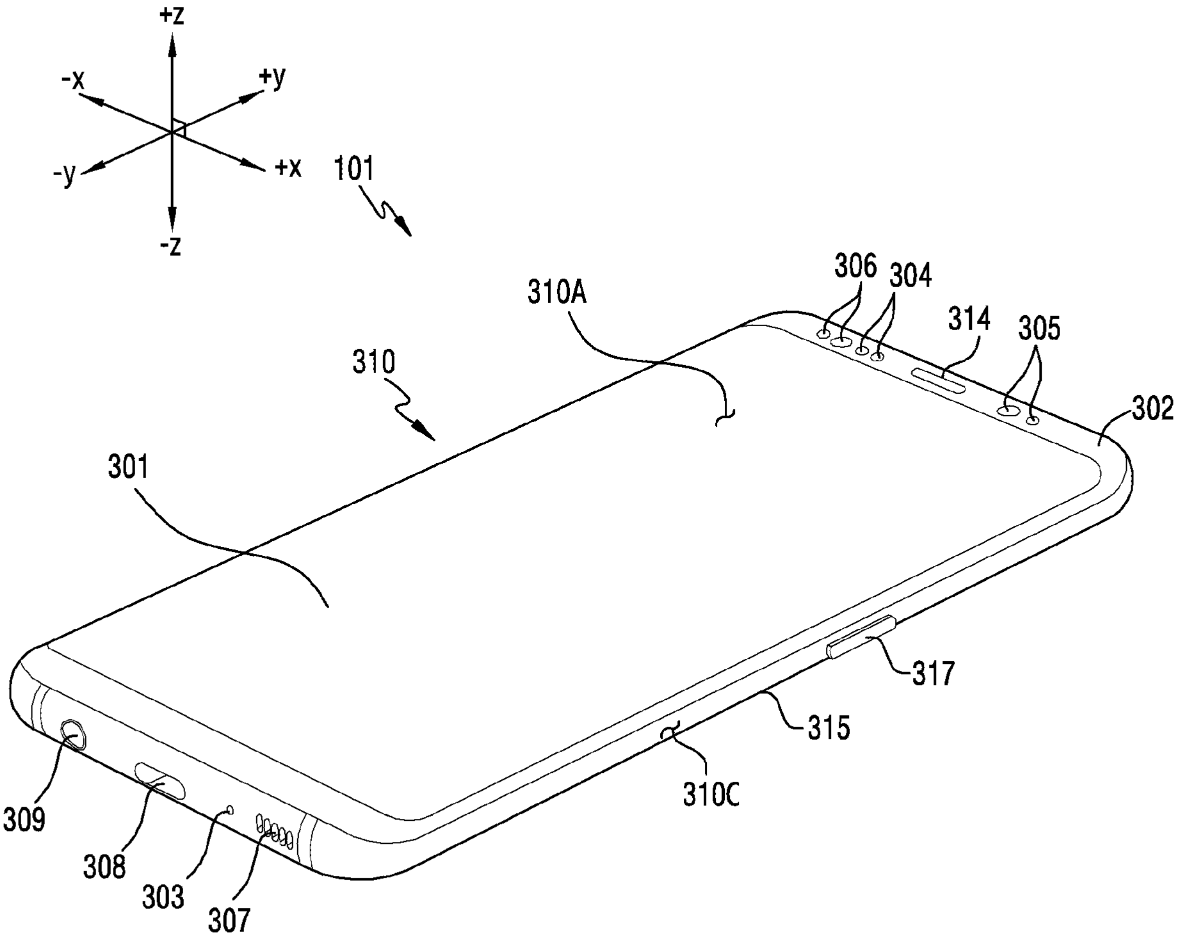
FIG. 3A is a perspective view showing an example electronic device according to various embodiments.

FIG. 3A is a perspective view showing an example electronic device according to various embodiments.

Figure 3B:
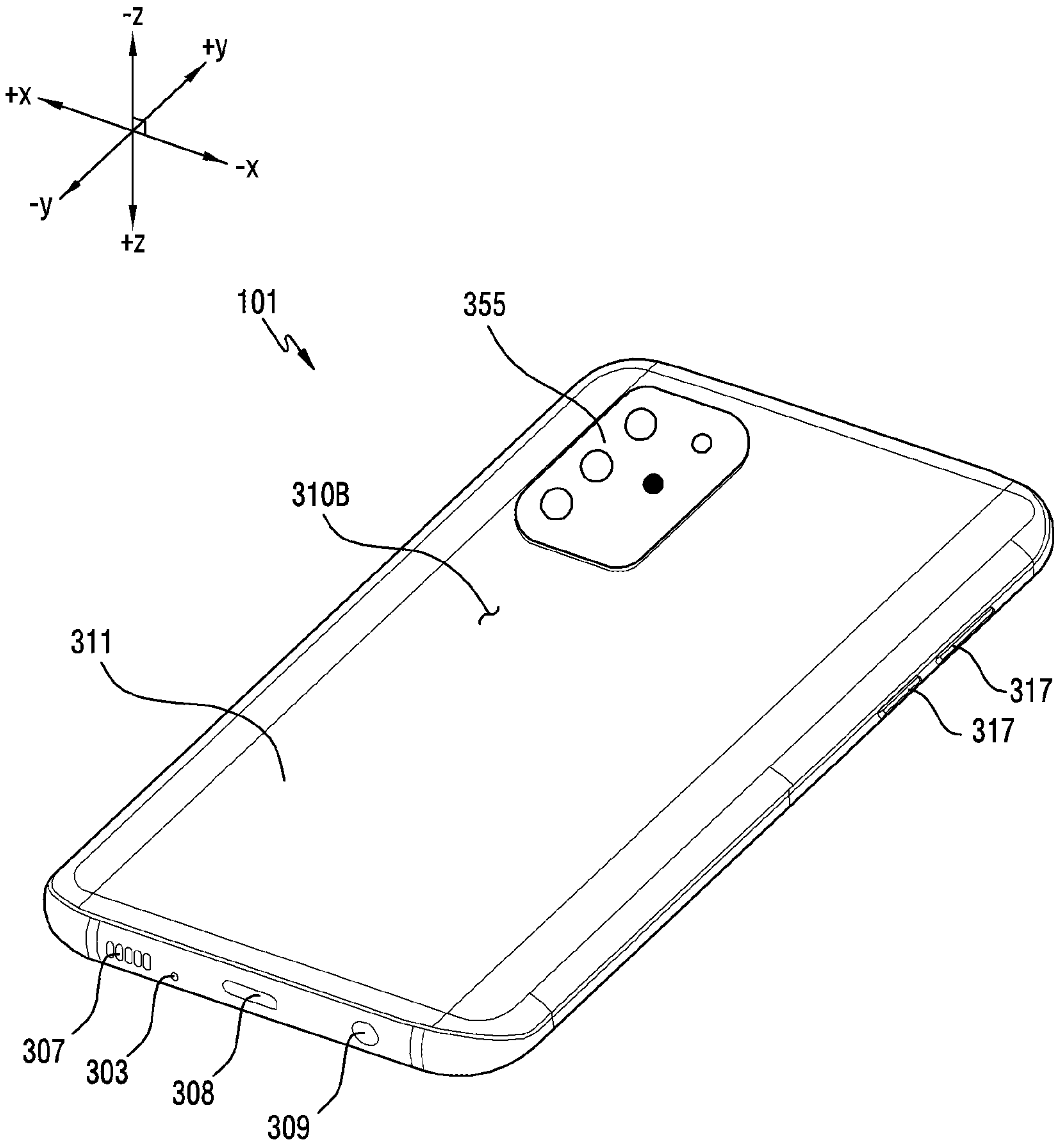
FIG. 3B is a perspective view showing the shape, in which the electronic device of FIG. 3A is seen from the rear surface thereof, according to various embodiments.

FIG. 3B is a perspective view showing the shape, in which the electronic device of FIG. 3A is seen from the rear surface thereof, according to various embodiments.

Referring to FIG. 3A and FIG. 3B, an electronic device 101 according to an embodiment may include a first surface (or a front surface) 310A, a second surface (or a rear surface) 310B, and a housing 310 including a side surface (or a side wall) 310C configured to surround the space between the first surface 310A and the second surface 310B. In an embodiment (not shown), the housing may be referred to as a structure configured to form a part of the first surface 310A, the second surface 310B, and the side surface 310C of FIG. 3A and FIG. 3B.

According to an embodiment, the first surface 310A of the electronic device 101 may be formed by a front plate 302 (e.g., a glass plate including various coating layers, or a polymer plate) of which at least a portion is substantially transparent. In an embodiment, the front plate 302 may include a curved-surface portion configured to be bent from the first surface 310A toward the rear plate 311 in at least a side edge portion thereof and to seamlessly extend therefrom.

According to an embodiment, the second surface 310B may be formed by the rear plate 311 substantially opaque. For example, the rear plate 311 may be formed by or include coated or colored glass, ceramic, polymer, metal (e.g., aluminum, stainless steel (STS), or magnesium), or a combination of at least two of the above materials. According to an embodiment, the rear plate 311 may include a curved-surface portion configured to be bent from the second surface 310B toward the front plate 302 in at least a side edge portion thereof and to seamlessly extend therefrom.

According to an embodiment, the side surface 310C of the electronic device 101 may be coupled to the front plate 302 and the rear plate 311, and may be formed by a frame 315 including a metal and/or a polymer. In an embodiment, the rear plate 311 and the frame 315 may be integrally formed, and may include a substantially identical material (e.g., a metal material such as aluminum).

According to an embodiment, the electronic device 101 may include at least one of a display 301, an audio module 170, a sensor module 304, a first camera module 305, a key input device 317, a first connector hole 308, and a second connector hole 309. In an embodiment, at least one (e.g., the key input device 317) of elements of the electronic device 101 may be omitted therefrom, and the electronic device 101 may additionally include other components. For example, within an area provided by the front plate 302, a sensor such as a proximity sensor and an illuminance sensor may be integrated to the display 301, or may be disposed at a position adjacent to the display 301. In an embodiment, the electronic device 101 may further include a light-emitting element 306, and the light emitting element 306 may be disposed at a position adjacent to the display 301 within an area provided by the front plate 302. For example, the light-emitting element 306 may be configured to provide state information of the electronic device 101 in the form of light. In an embodiment, for example, the light-emitting element 306 may be configured to provide a light source interlocked with an operation of the first camera module 305. For example, the light-emitting element 306 may include an LED, an IR LED, and a xenon lamp.

For example, the display 301 may be exposed through a substantial portion of the front plate 302. In an embodiment, the corner of the display 301 may be formed to have a shape which is generally the same as an outer shape (e.g., a curved-surface) adjacent to the front plate 302. In an embodiment, in order to expand an area which allows the display 301 to be exposed, the gaps between the outer perimeter of the display 301 and the outer perimeter of the front plate 302 may be formed to be substantially identical. In an embodiment, a recess or an opening may be formed in a part of a screen display area of the display 301, and other electronic components, which are aligned with the recess or the opening, for example, the first camera module 305 and a proximity sensor or an illuminance sensor not illustrated, may be included therein.

In an embodiment, the display 301 may be coupled to or disposed adjacently to a touch detection circuit, a pressure sensor capable of measuring the intensity (pressure) of touch, and/or a digitizer configured to detect a magnetic field-type stylus pen.

In an embodiment, the audio module 170 may include a microphone hole 303, at least one speaker hole 307, and a receiver hole 314 for a call. The microphone hole 303 may have a microphone disposed therein to acquire external sound, and in an embodiment, a plurality of microphones may be disposed to detect the direction of sound. In an embodiment, the at least one speaker hole 307 and the receiver hole 314 for a call may be implemented as one hole together with the microphone hole 303, and a speaker (e.g., a piezo speaker) may be included therein without the at least one speaker hole 307 and the receiver hole 314 for a call.

In an embodiment, the electronic device 101 may include the sensor module 304, and thus may be configured to generate an electrical signal or data value corresponding to an internal operating state of the electronic device 101 or an external environmental state. For example, the sensor module 304 may further include a proximity sensor disposed on the first surface 310A of the housing 310, a fingerprint sensor integrated into or disposed adjacent to display 301, and/or a biometric sensor (e.g., HRM sensor) disposed on the second surface 310B of the housing 310. The electronic device 101 may further include a sensor module not illustrated, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

In an embodiment, the electronic device 101 may include a second camera module 355 disposed on the second surface 310B. The first camera module 305 and the second camera module 355 may include one lens or a plurality of lenses, an image sensor, and/or an image signal processor. A flash (not illustrated) may be disposed on the second surface 310B. For example, the flash may include a light-emitting diode or a xenon lamp. In an embodiment, two or more lenses (an infrared camera, a wide-angle lens, and a telephoto lens) and image sensors may be disposed on one surface of the electronic device 101.

In an embodiment, the key input device 317 may be disposed on the side surface 310C of the housing 310. In an embodiment, the electronic device 101 may not include a part or the whole of key input device 317 mentioned above, and the key input device 317 not included therein may be implemented as a different type such as a soft key, on the display 301. In an embodiment, the key input device may include at least a part of a fingerprint sensor disposed on the second surface 310B of the housing 310.

In an embodiment, the connector holes 308 and 309 may include a first connector hole 308 capable of accommodating a connector (for example, a USB connector) for transmitting and receiving power and/or data to and from an external electronic device, and/or a second connector hole 309 (for example, an earphone jack) capable of accommodating a connector for transmitting and receiving audio signals to and from an external electronic device.

Although FIG. 3A and FIG. 3B illustrate that the electronic device 101 corresponds to a bar-type device, this is merely an example, and the electronic device 101 may correspond to various types of devices. For example, the electronic device 101 may correspond to a foldable device, a slidable device, a wearable device (e.g., a smart watch or a wireless earphone), or a tablet PC. Accordingly, the technical ideas of this disclosure are not be limited to the bar-type device illustrated in FIG. 3A and FIG. 3B, and may be applied to various types of devices.

Figure 4A:
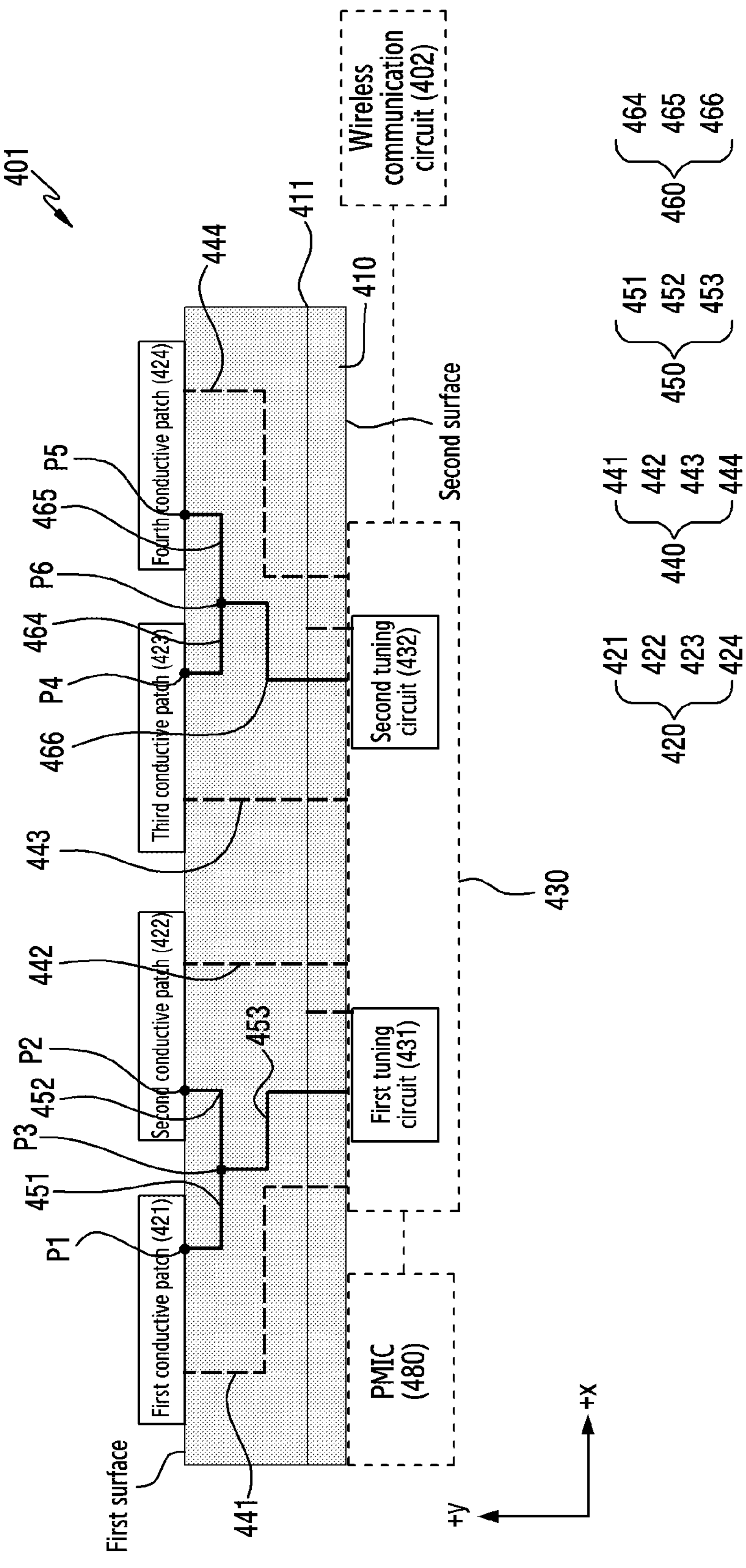
FIG. 4A is a view showing a cross-sectional view of an example antenna module according to various embodiments.

FIG. 4A is a view showing a cross-sectional view of an example antenna module according to various embodiments.

Referring to FIG. 4A, the electronic device 101 according to an embodiment may include an antenna module 401. In an embodiment, the antenna module 401 may include a printed circuit board 410, a plurality of conductive patches 420, an RFIC 430, a connection path 440 configured to connect the RFIC 430 and the plurality of conductive patches 420, a first conductive structure 450, a second conductive structure 460, and/or a PMIC 480.

According to an embodiment, the printed circuit board 410 may include a first surface and a second surface opposite to the first surface. In an embodiment, various electronic components (e.g., the plurality of conductive patches 420 and the RFIC 430) may be disposed on the first surface and/or the second surface of the printed circuit board 410. In an embodiment, the antenna module 401 may be disposed at various positions in the electronic device 101. For example, the antenna module 401 may be disposed in the electronic device 101 such that the first surface of the printed circuit board 410 faces the first side surface of the electronic device 101, which is formed by the frame 315. For another example, the antenna module 401 may be disposed in the electronic device 101 such that the first surface of the printed circuit board 410 faces the rear surface 310B of the electronic device 101, which is formed by the rear plate 311.

According to an embodiment, the printed circuit board 410 may include a plurality of conductive layers and non-conductive layers alternately stacked with the plurality of conductive layers. In an embodiment, as will be described later through FIG. 4B, the printed circuit board 410 may be configured to provide an electrical connection between various electronic components disposed on the printed circuit board 410 using wires and conductive vias formed in a conductive layer. In an embodiment, a ground may be formed on a first conductive layer 411 among the plurality of conductive layers of the printed circuit board 410. The ground formed on the first conductive layer 411 may be used as a ground for an antenna operation.

According to an embodiment, the plurality of conductive patches 420 may include a first conductive patch 421, a second conductive patch 422, a third conductive patch 423, and/or a fourth conductive patch 424. For example, the plurality of conductive patches 420 may be disposed on the first surface of the printed circuit board 410. As another example, the plurality of conductive patches 420 may be disposed in the printed circuit board 410 to be closer to the first surface than to the second surface of the printed circuit board 410. In an embodiment, the plurality of conductive patches 420 may be configured to operate as antenna elements so as to form a directional beam. According to an embodiment, the antenna module 401 may include a plurality of antenna arrays (e.g., a dipole antenna array and/or an additional patch antenna array) configured to have an identical shape or different shapes, or an identical type or different types, in addition to the plurality of conductive patches 420.

According to an embodiment, the RFIC 430 may include a first tuning circuit 431 and/or a second tuning circuit 432. In an embodiment, the RFIC 430 may be disposed on the second surface of the printed circuit board 410. In an embodiment, the RFIC 430 may include a power amplifier (PA), a low noise amplifier (LNA), and/or a phase shifter. In an embodiment, the RFIC 430 may be configured to process an RF signal in a designated frequency band, which is transmitted and/or received through the plurality of conductive patches 420. In an embodiment, in order to transmit an RF signal in a designated frequency band, the RFIC 430 may be configured to convert an intermediate frequency (IF) signal (e.g., about 9-11 GHz) or a baseband signal obtained from a wireless communication circuit 402 to be described later into an RF signal in a designated frequency band. The RFIC 430 may be configured to convert an RF signal in a designated frequency band received through the plurality of conductive patches 420 into a baseband signal or an IF signal and then to provide same to the wireless communication circuit 402.

Although it has been described in FIG. 4A that the RFIC 430 is disposed on the second surface of the printed circuit board 410, this is merely for the convenience of description, and the RFIC 430 may be disposed in various positions of the printed circuit board 410. For example, in an embodiment, the RFIC 430 may be disposed on a conductive layer inside the printed circuit board 410.

According to an embodiment, the wireless communication circuit 402 may be disposed in various positions in the electronic device 101. For example, the wireless communication circuit 402 may be disposed on the first surface or the second surface of the printed circuit board 410. For another example, the wireless communication circuit 402 may be disposed on an additional printed circuit board separate from the printed circuit board 410. For another example, the wireless communication circuit 402 may be disposed on another conductive structure (e.g., a flexible printed circuit board (FPCB) or an antenna carrier) in the electronic device 101. In an embodiment, the wireless communication circuit 402 may include a communication processor and/or an intermediate frequency integrated circuit (IFIC). In FIG. 4A, although the wireless communication circuit 402 and the RFIC 430 are separately described, this is merely for the convenience of description. In an embodiment, a communication processor (e.g., the first communication processor 212 of FIG. 2) and/or the RFIC 430 and the wireless communication circuit 402 including an IFIC may be one wireless communication circuit.

According to an embodiment, the wireless communication circuit 402 may be configured to feed the plurality of conductive patches 420 through the connection path 440 connected to the RFIC 430. For example, the wireless communication circuit 402 may be configured to feed the first conductive patch 421 through a first connection path 441 connected to the RFIC 430. For another example, the wireless communication circuit 402 may be configured to feed the second conductive patch 422 through a second connection path 442 connected to the RFIC 430. For another example, the wireless communication circuit 402 may be configured to feed the third conductive patch 423 through a third connection path 443 connected to the RFIC 430. For another example, the wireless communication circuit 402 may be configured to feed the fourth conductive patch 424 through a fourth connection path 444 connected to the RFIC 430. In an embodiment, the wireless communication circuit 402 may be configured to feed the plurality of conductive patches 420 to transmit and/or receive a signal in a designated frequency band (e.g., about 23-36 GHz).

According to an embodiment, the connection path 440 may be correspond to a feeding line for supplying power to the plurality of conductive patches 420.

According to an embodiment, the first conductive patch 421 and the second conductive patch 422 may be electrically connected to the first tuning circuit 431 through the first conductive structure 450. For example, the first conductive structure 450 may include a first portion 451 configured to extend from a first point P1 of the first conductive patch 421, a second portion 452 configured to extend from a second point P2 of the second conductive patch 422 and connected to a third point P3 positioned at one end of the first portion 451, and/or a first common portion 453 configured to extend from the third point P3 and connected to the first tuning circuit 431. For example, the first conductive patch 421 and the second conductive patch 422 may be electrically connected to the first tuning circuit 431 through the first common portion 453 of the first conductive structure 450. In an embodiment, the first tuning circuit 431 may be electrically connected to a ground formed on the first conductive layer 411 of the printed circuit board 410. For example, the first conductive patch 421 and the second conductive patch 422 may be electrically connected to the first conductive layer 411 including the ground through the first common portion 453 and the first tuning circuit 431.

According to an embodiment, the first conductive structure 450 may correspond to a ground line for connecting the first conductive patch 421 and the second conductive patch 422 to a ground of the electronic device 101.

According to an embodiment, the first portion 451 and the second portion 452 of the first conductive structure 450 may be configured to have a substantially identical electrical length.

According to an embodiment, the third conductive patch 423 and the fourth conductive patch 424 may be electrically connected to the second tuning circuit 432 through the second conductive structure 460. For example, the second conductive structure 460 may include a fourth portion 464 configured to extend from a fourth point P4 of the third conductive patch 423, a fifth portion 465 configured to extend from a fifth point P5 of the fourth conductive patch 424 and connected to a sixth point P6 positioned at one end of the fourth portion 464, and/or a second common portion 466 configured to extend from the sixth point P6 and connected to the second tuning circuit 432. For example, the third conductive patch 423 and the fourth conductive patch 424 may be connected to the second tuning circuit 432 through the second common portion 466 of the second conductive structure 460. In an embodiment, the second tuning circuit 432 may be electrically connected to a ground formed on the first conductive layer 411 of the printed circuit board 410. For example, the third conductive patch 423 and the fourth conductive patch 424 may be electrically connected to the first conductive layer 411 including the ground through the second common portion 466 and the second tuning circuit 432.

According to an embodiment, the second conductive structure 460 may correspond to a ground line for connecting the third conductive patch 423 and the fourth conductive patch 424 to a ground of the electronic device 101.

According to an embodiment, the fourth portion 464 and the fifth portion 465 of the second conductive structure 460 may be configured to have a substantially identical electrical length.

According to an embodiment, at least two of the plurality of conductive patches 420 may be connected to one tuning circuit (e.g., the first tuning circuit 431 or the second tuning circuit 432), and thus the electronic device 101 may be configured to have a reduced number of tuning circuits included in the antenna module 401. For example, the electronic device 101 may be configured to reduce the size of the RFIC 430 including the first tuning circuit 431 and/or the second tuning circuit 432 so as to provide a space in which other electronic components may be disposed.

According to an embodiment, the PMIC 480 may be disposed on the second surface of the printed circuit board 410. The PMIC 480 may be configured to supply power required for various electronic components (e.g., the RFIC 430) of the antenna module 401.

According to an embodiment, the electronic device 101 may further include a shielding member disposed on the second surface of the printed circuit board 410 so as to electromagnetically shield at least one of the RFIC 430 and the PMIC 480. The shielding member may include a shield can or an encapsulation material such as an epoxy molding compound (EMC), but is not limited thereto.

Although the antenna module 401 illustrated in FIG. 4A is shown to include the plurality of conductive patches 420 configured to form a 1×4 antenna array, the disclosure is not limited in this respect, and the antenna module 401 may include a plurality of conductive patches having various numbers and arrangement structures. For example, the antenna module 401 may include the first conductive patch 421 and the second conductive patch 422, and the first conductive patch 421 and the second conductive patch 422 may be configured to form a 1×2 antenna array. For another example, the antenna module 401 may include the first conductive patch 421, the second conductive patch 422, the third conductive patch 423, and the fourth conductive patch 424, and the first conductive patch 421, the second conductive patch 422, the third conductive patch 423, and the fourth conductive patch 424 may be configured to form a 1×4 antenna array.

In this disclosure, although the antenna module 401 is described as including the plurality of conductive patches 420, this is merely by way of example for the convenience of description, and the antenna module 401 may include conductive patterns configured to operate as various types of antennas. For example, in an embodiment, the antenna module 401 may include a plurality of conductive patterns configured to operate as a dipole antenna. In addition, the description of the plurality of conductive patches 420 disclosed in the document may be applied to the plurality of conductive patterns. For example, the antenna module 401 may include a first conductive pattern and a second conductive pattern, and the antenna module 401 may include a conductive structure including a first portion connected to the first conductive pattern, a second portion connected to the second conductive pattern, and a common portion to which the first portion and the second portion are joined. For example, the first conductive pattern and the second conductive pattern may be electrically connected to an RFIC of the antenna module 401 through the conductive structure including the common portion.

Figure 4B:
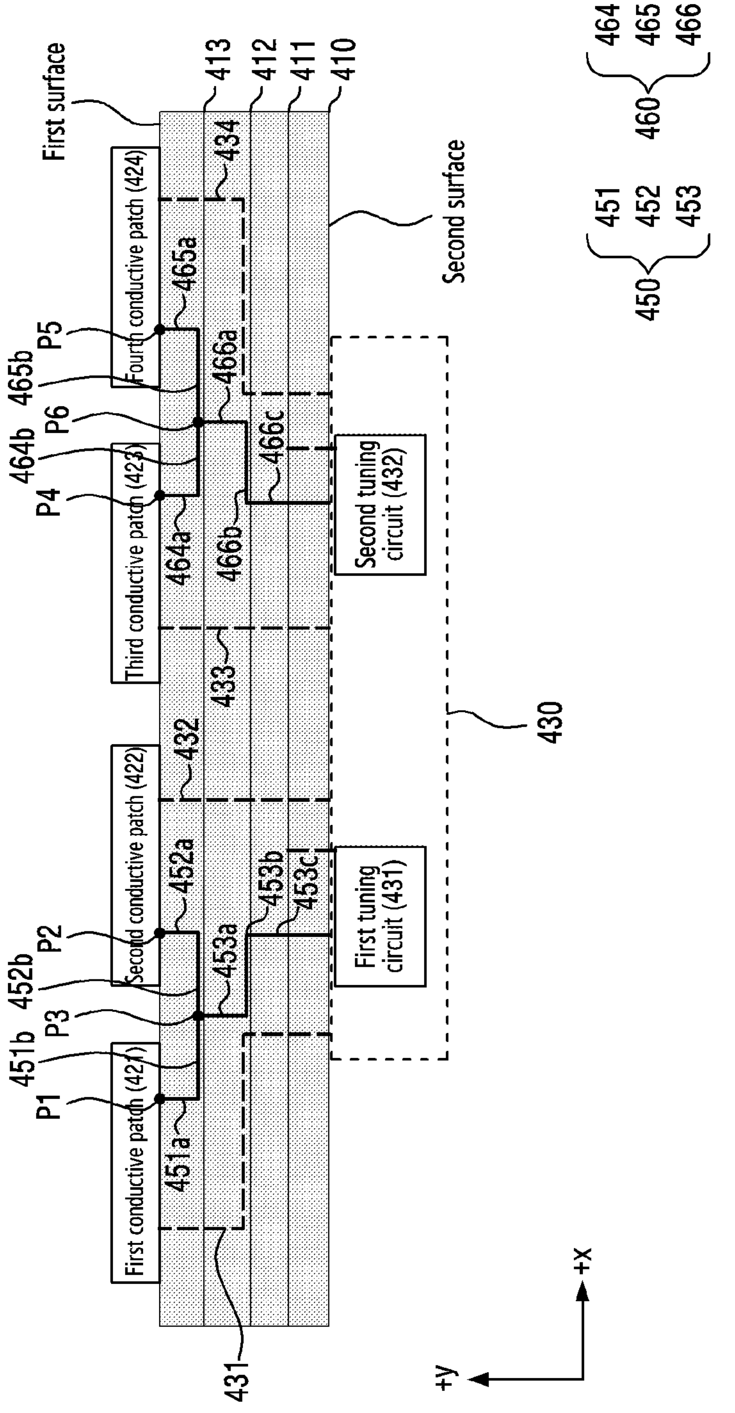
FIG. 4B is a view for explaining a specific structure of a conductive structure according to various embodiments.

FIG. 4B is a view for explaining a structure of an example conductive structure according to various embodiments.

Referring to FIG. 4B, the printed circuit board 410 according to an embodiment may include the first conductive layer 411, the second conductive layer 412, and/or a third conductive layer 413.

According to an embodiment, the first portion 451 of the first conductive structure 450 may include a first via part 451*a* configured to extend from the first point P1 of the first conductive patch 421 in a first direction (e.g., the −y-direction), and a first wiring part 451*b* configured to extend from the first via part 451*a* and formed on the third conductive layer 413. In an embodiment, the first direction (e.g., the −y-direction) may refer, for example, to a direction from the first surface toward the second surface of the printed circuit board 410. In an embodiment, for example, the first wiring part 451*b* may be formed as a microstrip.

According to an embodiment, the second portion 452 of the first conductive structure 450 may include a second via part 452*a* configured to extend from the second point P2 of the second patch 422 in the first direction (e.g., the −y-direction), and a second wiring part 452*b* configured to extend from the second via part 452*a* and formed on the third conductive layer 413. In an embodiment, the first wiring part 451*b* of the first portion 451 may be connected to the second wiring part 452*b* of the second portion 452 at the third point P3.

According to an embodiment, the first common portion 453 of the first conductive structure 450 may include a third via part 453*a* configured to extend from the third point P3 in the first direction (e.g., the −y-direction), a third wiring part 453*b* configured to extend from the third via part 453*a* and formed on the second conductive layer 412, and a fourth via part 453*c* configured to extend from the third wiring part 453*b* in the first direction (e.g., the −y-direction).

In FIG. 4B, although the first portion 451 of the first conductive structure 450 is described as including the first via part 451*a* and the first wiring part 451*b*, this is merely an example, and in an embodiment, an additional via part and/or wiring part may be included therein. As another example, the second portion 452 of the first conductive structure 450 may include an additional via part and/or wiring part in addition to the second via part 452*a* and the second wiring part 452*b*. As another example, the first common portion 453 of the first conductive structure 450 may include an additional via part and/or wiring part in addition to the third via part 453*a*, the third wiring part 453*b*, and the fourth via part 453*c*.

According to an embodiment, the fourth portion 464 of the second conductive structure 460 may include a fifth via part 464*a* configured to extend from the fourth point P4 of the third conductive patch 423 in the first direction (e.g., the −y-direction), and a fourth wiring part 464*b* configured to extend from the fifth via part 464*a* and formed on the third conductive layer 413.

According to an embodiment, the fifth portion 465 of the second conductive structure 460 may include a sixth via part 465*a* configured to extend from the fifth point P5 of the fourth conductive patch 424 in the first direction (e.g., the −y-direction), and a fifth wiring part 465*b* configured to extend from the sixth via part 465*a* and formed on the third conductive layer 413. In an embodiment, the fourth wiring part 464*b* of the fourth portion 464 may be connected to the fifth wiring part 465*b* of the fifth portion 465 at the sixth point P6.

According to an embodiment, the second common portion 466 of the second conductive structure 460 may include a seventh via part 466*a* configured to extend from the sixth point P6 in the first direction (e.g., the −y-direction), a sixth wiring part 466*b* configured to extend from the seventh via part 466*a* and formed on the second conductive layer 412, and an eighth via part 466*c* configured to extend from the sixth wiring part 466*b* in the first direction (e.g., the −y-direction).

In FIG. 4B, although the fourth portion 464 of the second conductive structure 460 is described as including the fifth via part 464*a* and the fourth wiring part 464*b*, this is merely an example, and in an embodiment, an additional via part and/or wiring part may be included therein. As another example, the fifth portion 465 of the second conductive structure 460 may include an additional via part and/or wiring part in addition to the sixth via part 465*a* and the fifth wiring part 465*b*. As another example, the second common portion 466 of the second conductive structure 460 may include an additional via part and/or wiring part in addition to the seventh via part 466*a*, the sixth wiring part 466*b*, and the eighth via part 466*c*.

Figure 5A:
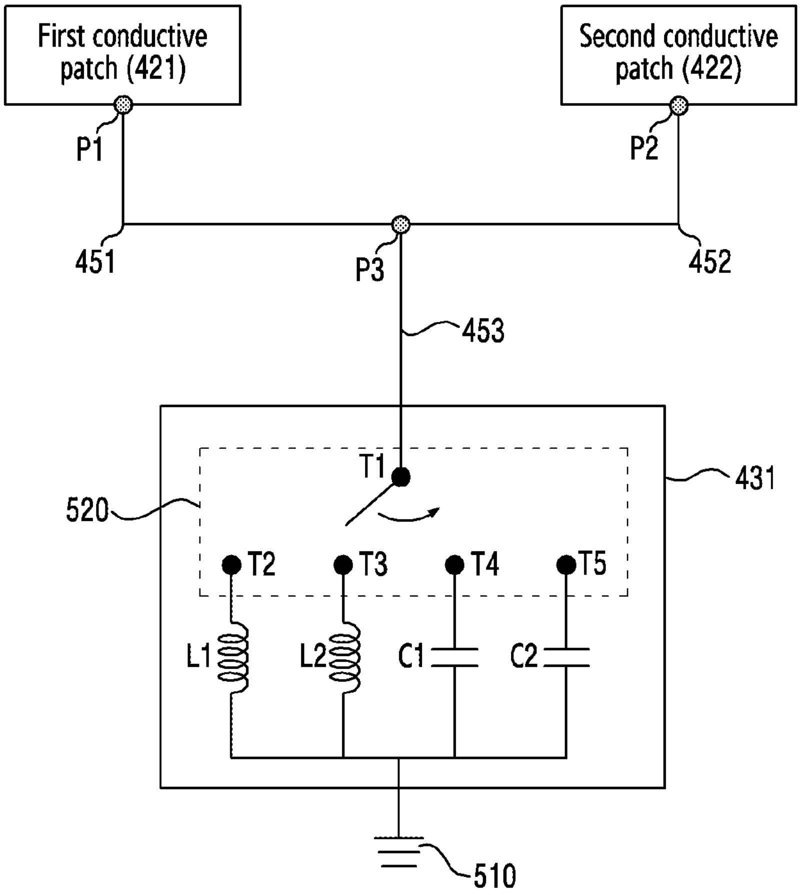
FIG. 5A is a view for explaining an example first tuning circuit including at least one lumped element according to various embodiments.

FIG. 5A is a view for explaining an example first tuning circuit including at least one lumped element according to various embodiments.

Referring to FIG. 5A, the first tuning circuit 431 according to an embodiment may include at least one lumped element. For example, the first tuning circuit 431 may include a first inductor L1 having a first inductance, a second inductor L2 having a second inductance, a first capacitor C1 having a first capacitance, and/or a second capacitor having a second capacitance C2. The at least one lumped element may be electrically connected to a ground 510. In an embodiment, the ground 510 may refer, for example, to various conductive structures in the electronic device 101 or a ground formed on an electronic component. For example, the ground 510 may be formed on a first layer among a plurality of conductive layers of the antenna module 401. For another example, the ground 510 may refer, for example, to a ground formed on a conductive structure (e.g., a metal plate) in the electronic device 101.

According to an embodiment, the wireless communication circuit 402 may be configured to control the first tuning circuit 431 such that the first tuning circuit 431 has a designated impedance corresponding to a designated frequency band and connects the plurality of conductive patches 420 and the ground 510. In an embodiment, the wireless communication circuit 402 may be configured to perform impedance matching through the first tuning circuit 431. For example, the designated frequency band may refer, for example, to a frequency band of an RF signal transmitted and/or received by the first conductive patch 421 and the second conductive patch 422. As another example, a frequency band of an RF signal transmitted and/or received by the first conductive patch 421 and the second conductive patch 422 may be varied. For example, the first tuning circuit 431 may include a switch circuit 520, and the wireless communication circuit 402 may be configured to control the switch circuit 520 so as to connect a first port T1, to which the first conductive patch 421 and the second conductive patch 422 are connected, to a second port T2 to which the first inductor L1 is connected. For another example, the wireless communication circuit 402 may be configured to control the switch circuit 520 so as to connect the first port T1 to a third port T3 to which the second inductor L2 is connected. For another example, the wireless communication circuit 402 may be configured to control the switch circuit 520 so as to connect the first port T1 to a fourth port T4 to which the first capacitor C1 is connected, or so as to connect the first port T1 to a fifth port T5 to which the second capacitor C2.

The structure of the first tuning circuit 431 illustrated in FIG. 5A is merely an example, and the disclosure is not limited in this respect. In an embodiment, the first tuning circuit 431 may include various types and numbers of lumped elements, and may be configured to perform impedance matching using various types and numbers of lumped elements. For example, the first tuning circuit 431 may include a variable capacitor, and may be configured to adjust a capacitance value of the variable capacitor so as to perform impedance matching. As another example, as illustrated FIG. 5A, it is merely an example that at least one lumped element (e.g., the first inductor L1) of the first tuning circuit 431 is connected to the ground 510 in series, and in an embodiment, the lumped elements included in the first tuning circuit 431 may have various topologies and may be connected to the ground 510. For example, the lumped elements included in the first tuning circuit 431 may be connected to the ground 510 in parallel.

Although FIG. 5A illustrates that the first tuning circuit 431 according to an embodiment performs impedance matching using at least one lumped element, this is merely an example, and in an embodiment, the first tuning circuit 431 may be configured to perform impedance matching using various elements. For example, the first tuning circuit 431 may include a varactor, and the wireless communication circuit 402 may be configured to control the first tuning circuit 431 using a varactor such that the first tuning circuit 431 has an impedance corresponding to a designated frequency band. For example, the first tuning circuit 431 may be configured to perform impedance matching using a varactor.

Figure 5B:
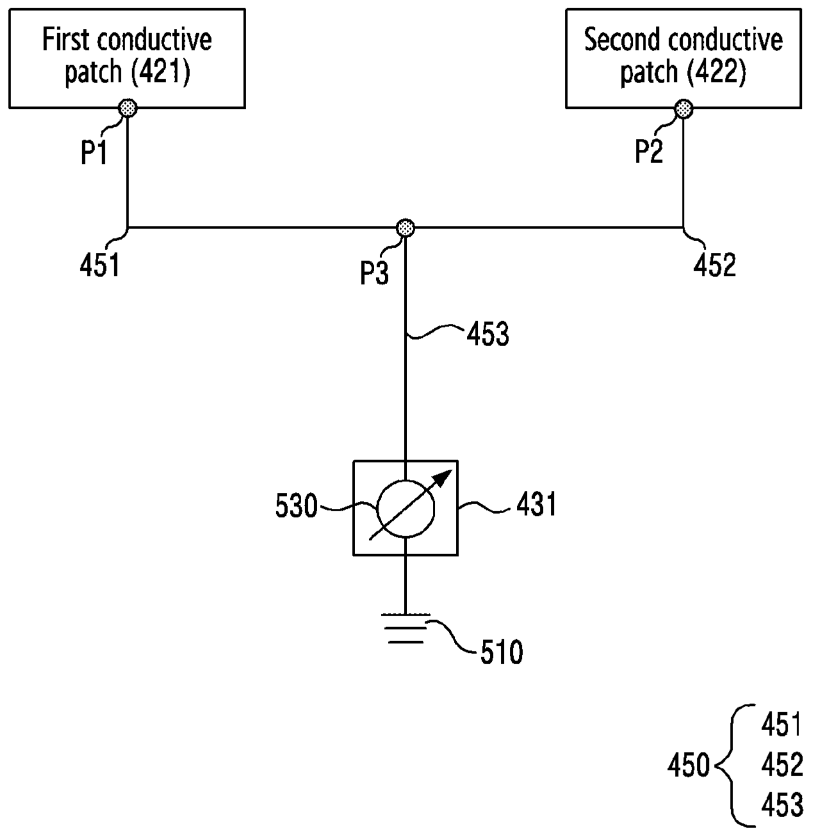
FIG. 5B is a view for explaining an example first tuning circuit including a phase shifter according to various embodiments.

FIG. 5B is a view for explaining an example first tuning circuit including a phase shifter according to various embodiments.

According to an embodiment, the first tuning circuit 431 may include a phase shifter 530. According to an embodiment, the first conductive patch 421 and the second conductive patch 422 may be connected to one phase shifter 530 through the first conductive structure 450. For example, the phase shifter 530 of the first tuning circuit 431 may be configured to be commonly used for the first conductive patch 421 and the second conductive patch 422, so that the electronic device 101 is configured to have reduced size of the RFIC 430 including the first tuning circuit 431. For example, if the phase shifter 530 is not commonly used for the first conductive patch 421 and the second conductive patch 422, the RFIC should include a first phase shifter corresponding to the first conductive patch 421 and a second phase shifter corresponding to the second conductive patch. In contrast, according to an embodiment, since the phase shifter 530 of the first tuning circuit 431 is commonly used for the first conductive patch 421 and the second conductive patch 422, the number of the phase shifters included in the RFIC 430 may be reduced, and as a result, the size of the RFIC 430 may be reduced. In an embodiment, the phase shifter 530 may be configured to adjust a frequency band transmitted and/or received by the first conductive patch 421 and the second conductive patch 422.

Figure 6:
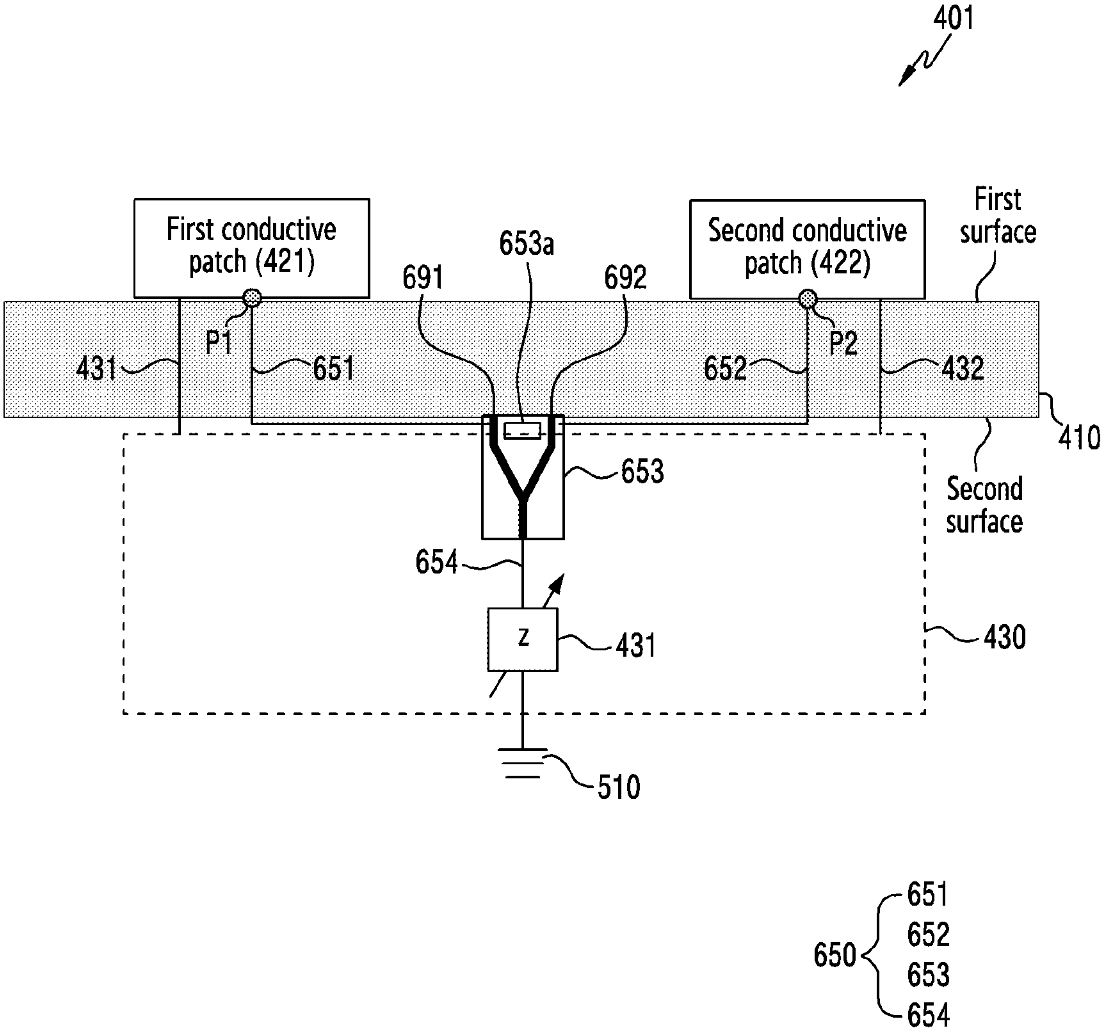
FIG. 6 illustrates a view showing a connection of a first conductive patch and a second conductive patch to a first tuning circuit using an example combiner according to various embodiments.

FIG. 6 illustrates a view showing a connection of a first conductive patch and a second conductive patch to a first tuning circuit using an example combiner according to various embodiments.

Referring to FIG. 6, the antenna module 401 according to an embodiment may include a conductive structure 650 configured to connect the first conductive patch 421 and the second conductive patch 422. For example, the conductive structure 650 may include a first portion 651 configured to extend from the first point P1 of the first conductive patch 421, a second portion 652 configured to extend from the second point P2 of the second conductive patch 422, a combiner 653 configured to connect the first portion 651 and the second portion 652, and/or a common portion 654 connected to the combiner 653. The common portion 654 may be connected to the first tuning circuit 431.

According to an embodiment, the combiner 653 may include an element 653*a* for matching impedance balance. For example, the element 653*a* may be configured to match the impedances of a first port 691 and a second port 692 of the combiner 653. For example, the element 653*a* may include a lumped element (e.g., a resistor). In an embodiment, the combiner 653 may include a conductive pattern, which replaces the element 653*a*, for matching impedance balance of the first port 691 and the second port 692. In an embodiment, the combiner 653 may include the element 653*a* and a conductive pattern together.

According to an embodiment, the first conductive patch 421 and the second conductive patch 422 may be connected to one tuning circuit (e.g., the first tuning circuit 431) through the combiner 653 and the common portion 654, and thus the electronic device 101 may be configured to have a reduced number of tuning circuits included in the antenna module 401. As a result, the electronic device 101 may be configured to have a reduced number of tuning circuits so as to reduce the size of the RFIC 430 including a tuning circuit and provide an additional mounting space for other electronic components.

In an embodiment, differently from the embodiment illustrated in FIG. 4A, the conductive structure 650 may include the combiner 653 configured to connect the first portion 651 and the second portion 652, and accordingly, the electronic device 101 may be configured to secure isolation between the first conductive patch 421 and the second conductive patch 422.

Figure 7:
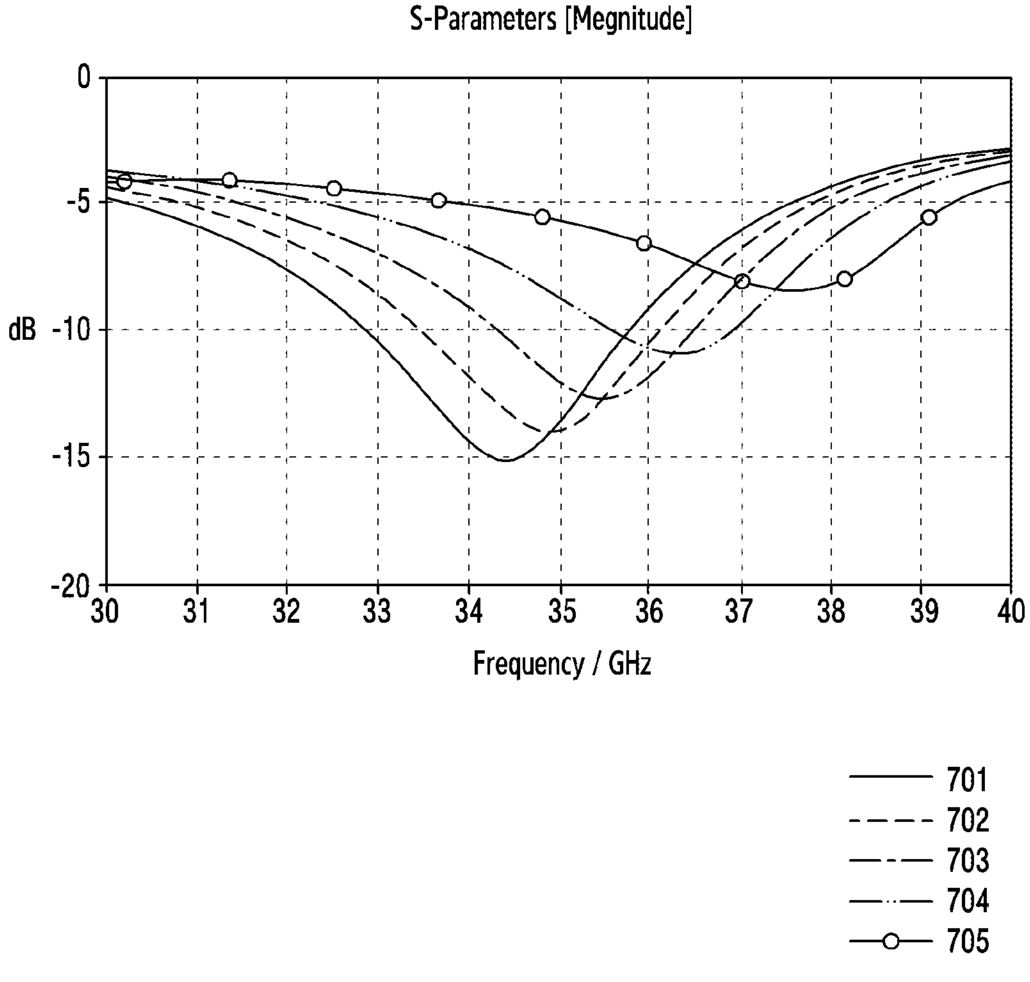
FIG. 7 is a view showing an S11 graph according to an impedance change of the first tuning circuit of FIG. 6 according to various embodiments.

FIG. 7 is a view showing an S11 graph according to an impedance change of the first tuning circuit of FIG. 6 according to various embodiments.

Referring to FIG. 7, the first tuning circuit 431 according to an embodiment may include a phase shifter (e.g., the phase shifter 530 of FIG. 5B). The impedance of the first tuning circuit 431 changes according to the phase shift of the phase shifter 530, and accordingly, a designated frequency band of an RF signal transmitted and/or received through the first conductive patch 421 and the second conductive patch 422 may be changed. For example, a first graph 701 shows the S11 value when the phase shift is about 0 degrees, a second graph 702 shows the S11 value when the phase shift is about 15 degrees, a third graph 703 shows the S11 value when the phase shift is about 30 degrees, a fourth graph 704 shows the S11 value when the phase shift is about 45 degrees, and a fifth graph 705 shows the S11 value when the phase shift is about 60 degrees. The S11 has a value of about −10 dB or less in a frequency band of about 33 to 36 GHz for the first graph 701 to the fourth graph 704 of an example. For example, even when the first conductive patch 421 and the second conductive patch 422 are commonly connected to the first tuning circuit 431 through the first conductive structure 450, the electronic device 101 may be configured to secure antenna performance in a designated frequency band (e.g., about 33-36 GHz).

Figure 8:
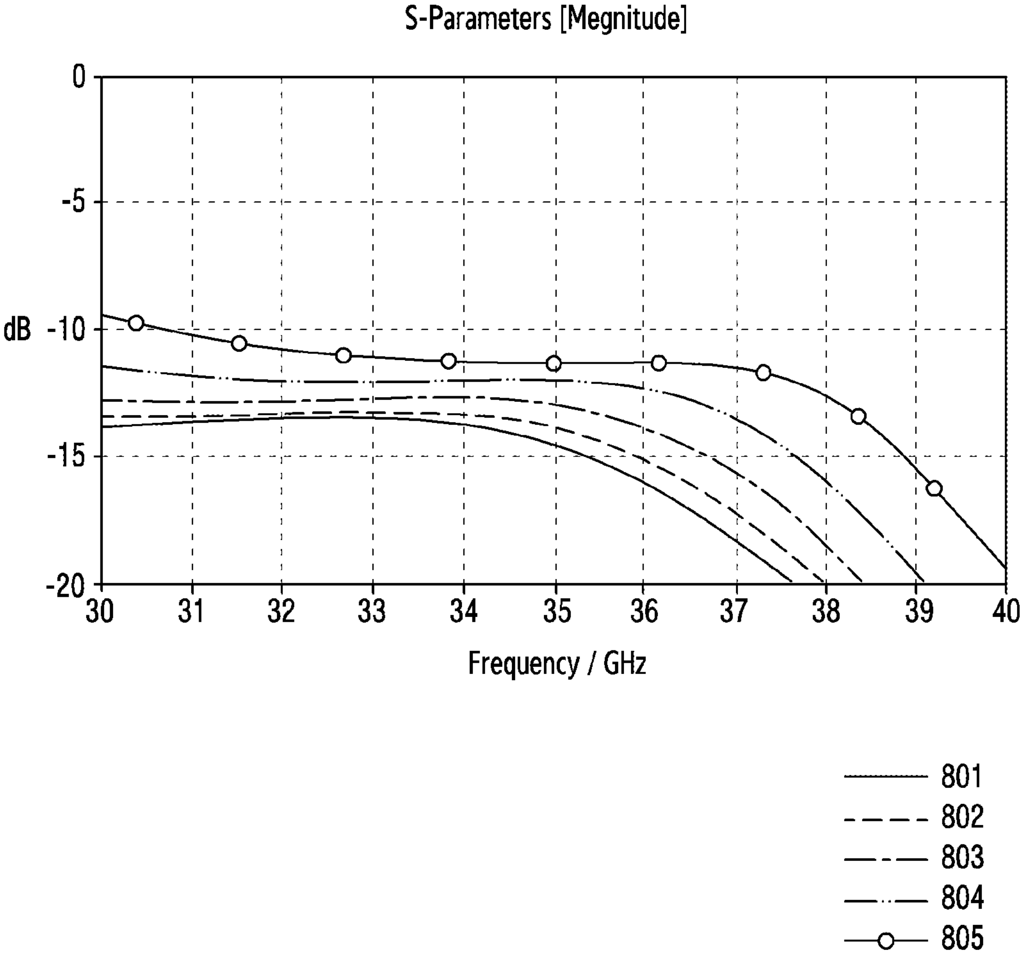
FIG. 8 is a view showing an S21 graph according to an impedance change of the first tuning circuit of FIG. 6 according to various embodiments.

FIG. 8 is a view showing an S21 graph according to an impedance change of the first tuning circuit of FIG. 6 according to various embodiments.

Referring to FIG. 8, according to an embodiment, a first graph 801 shows the S21 value when the phase shift is about 0 degrees, a second graph 802 shows the S21 value when the phase shift is about 15 degrees, a third graph 803 shows the S21 value when the phase shift is about 30 degrees, a fourth graph 804 shows the S21 value when the phase shift is about 45 degrees, and a fifth graph 805 shows the S21 value when the phase shift is about 60 degrees. The S21 has a value of about −10 dB or less in a frequency band of about 30-40 GHz for the first graph 801 to the fifth graph 805 of an example. For example, even when the first conductive patch 421 and the second conductive patch 422 are commonly connected to the first tuning circuit 431 through the first conductive structure 450, the electronic device 101 may be configured to secure antenna isolation between the first conductive patch 421 and the second conductive patch 422 in a designated frequency band (e.g., about 30-40 GHz).

Figure 9:
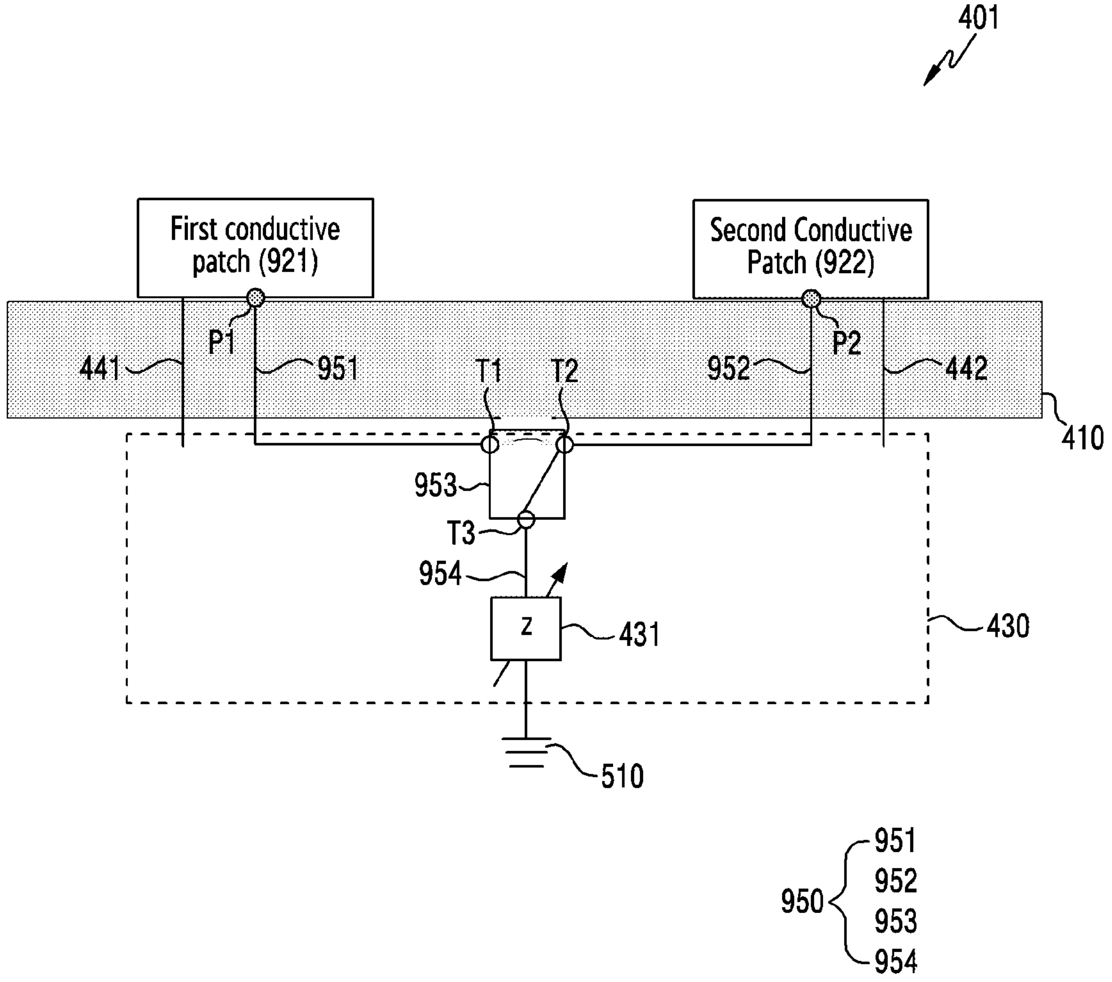
FIG. 9 is a view showing an example first conductive structure including a switch circuit according to various embodiments.

FIG. 9 is a view showing an example first conductive structure including a switch circuit according to various embodiments.

Referring to FIG. 9, the antenna module 401 according to an embodiment may include a first conductive structure 950 configured to connect a first conductive patch 921 and a second conductive patch 922 to the first tuning circuit 431. In an embodiment, the first conductive patch 921 may be included in a first antenna array, and the second conductive patch 922 may be included in a second antenna array. The first antenna array and the second antenna array may correspond to antenna arrays separate from each other. For example, the first antenna array and the second antenna array may be configured to transmit and/or receive signals of frequency bands different from each other. For another example, the first antenna array and the second antenna array may be configured to not operate at the same time. For example, when the first antenna array operates, the second antenna array may not operate, and when the second antenna array operates, the first antenna array may not operate.

In an embodiment, the first conductive structure 950 may include a first portion 951 configured to extend from the first point P1 of the first conductive patch 921, a second portion 952 configured to extend from the second point P2 of the second conductive patch 922, a switch circuit 953 configured to connect the first portion 951 and the second portion 952, and/or a common portion 954 connected to the switch circuit 953.

According to an embodiment, the first tuning circuit 431 may be selectively connected to the first conductive patch 921 or the second conductive patch 922 through the switch circuit 953. For example, the switch circuit 953 may include a first port T1 connected to the first portion 951, a second port T2 connected to the second portion 952, and/or a third port T3 connected to the first tuning circuit 431. In an example, the wireless communication circuit 402 may be configured to control the switch circuit 953 so as to electrically connect the first port T1 and the third port T3, and thus the first tuning circuit 431 may be electrically connected to the first conductive patch 921. In another example, the wireless communication circuit 402 may be configured to control the switch circuit 953 so as to electrically connect the second port T2 and the third port T3, and thus the first tuning circuit 431 may be electrically connected to the second conductive patch 922.

According to an embodiment, based on the connection relationship between a conductive patch (e.g., the first conductive patch 921 or the second conductive patch 922) and the ground 510 by the switch circuit 953, the wireless communication circuit 402 may be configured to control the RFIC 430 so as to feed the first conductive patch 921 and/or the second conductive patch 922, thereby transmitting and/or receiving a signal in a designated frequency band. For example, when the first port T1 and third port T3 are connected, the wireless communication circuit 402 may be configured to control the RFIC 430 so as to feed the first conductive patch 921 through the first connection path 441, thereby transmitting and/or receiving a signal in a designated frequency band. In an example, the case in which the first port T1 and the third port T3 are connected may refer, for example, to the first conductive patch 921 and the ground 510 being connected. For another example, when the second port T2 and third port T3 are connected, the wireless communication circuit 402 may be configured to control the RFIC 430 so as to feed the second conductive patch 922 through the second connection path 442, thereby transmitting and/or receiving a signal in a designated frequency band. In an example, the case in which the second port T2 and the third port T3 are connected may refer, for example, to the second conductive patch 922 and the ground 510 being connected.

Although the switch circuit 953 illustrated in FIG. 9 is shown as a single pole double through (SPDT) switch, this is merely an example, and the type of the switch circuit 953 is not limited thereto.

Figure 10:
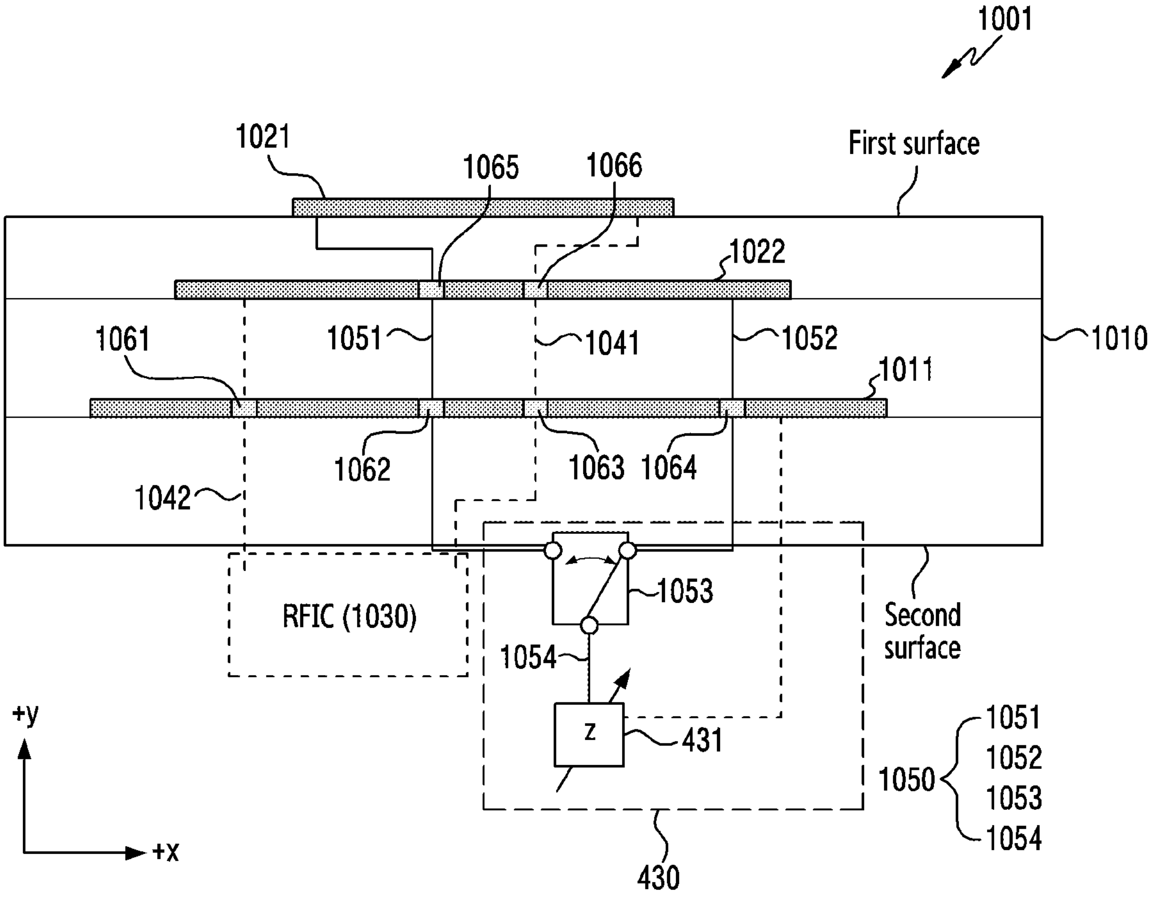
FIG. 10 is a view showing patch antennas stacked on a plurality of conductive layers of a printed circuit board of an example antenna module according to various embodiments.

FIG. 10 is a view showing patch antennas stacked on a plurality of conductive layers of a printed circuit board of an example antenna module according to various embodiments.

Referring to FIG. 10, the electronic device 101 according to an embodiment may include an antenna module 1001, and the antenna module 1001 may include a printed circuit board 1010. In an embodiment, the antenna module 1001 may include a first conductive patch 1021 disposed on a first surface of the printed circuit board 1010, a second conductive patch 1022 positioned in the first direction (e.g., the −y-direction) with respect to the first conductive patch 1021 and disposed inside the printed circuit board 1010, and/or a ground 1011.

In an embodiment, the second conductive patch 1022 may have a relatively larger area than the first conductive patch 1021. The first conductive patch 1021 may be configured to transmit and/or receive an RF signal of a first frequency band, and the second conductive patch 1022 may be configured to transmit and/or receive an RF signal of a second frequency band. For example, the first frequency band may refer, for example, to a relatively higher frequency band than the second frequency band.

According to an embodiment, the ground 1011 may include a first through-hole 1061, a second through-hole 1062, a third through-hole 1063, and/or a fourth through-hole 1064. In an embodiment, the second conductive patch 1022 may include a fifth through-hole 1065 and/or a sixth through-hole 1066.

According to an embodiment, the antenna module 1001 may include an RFIC 1030 disposed on the second surface of the printed circuit board 1010, and the RFIC 1030 may be configured to feed the first conductive patch 1021 through a first connection path 1041 to transmit and/or receive a signal of the first frequency band. For example, the first connection path 1041 connected to the RFIC 1030 may be configured to pass through the third through-hole 1063 formed through the ground 1011 and the sixth through-hole 1066 formed through the second conductive patch 1022 and to be electrically connected to the first conductive patch 1021. In this case, the first connection path 1041 may be configured to only pass through the ground 1011 and the second conductive patch 1022, and not to be electrically connected to the ground 1011 and the second conductive patch 1022. In an embodiment, the RFIC 1030 may be configured to feed the second conductive patch 1022 through a second connection path 1042 to transmit and/or receive a signal of the second frequency band. For example, the second connection path 1042 connected to the RFIC 1030 may be electrically connected to the second conductive patch 1022 through the first through-hole 1061 formed through the ground 1011. In this case, the second connection path 1042 may be configured to only pass through the ground 1011, and not to be electrically connected to the ground 1011.

According to an embodiment, the antenna module 1001 may include a first conductive structure 1050 configured to electrically connect the first conductive patch 1021 and the second conductive patch 1022 to the first tuning circuit 431.

In an embodiment, the first conductive structure 1050 may include a first portion 1051 connected to the first conductive patch 1021, a second portion 1052 connected to the second conductive patch 1022, a switch circuit 1053 configured to connect the first portion 1051 and the second portion 1052, and/or a common portion 1054 configured to connect the switch circuit 1053 and the first tuning circuit 431. The first tuning circuit 431 may be electrically connected to the ground 1011, and as a result, the first conductive patch 1021 and the second conductive patch 1022 may be electrically connected to the ground 1011 through the first conductive structure 1050 and the first tuning circuit 431. In an embodiment, the first portion 1051 of the first conductive structure 1050 may be configured to pass through the second through-hole 1062 formed through the ground 1011 and the fifth through-hole 1065 formed through the second conductive patch 1022, and to be electrically connected to the first conductive patch 1021. In this case, the first portion 1051 may be configured to only pass through the ground 1011, and not to be electrically connected to the ground 1011. In an embodiment, the second portion 1052 of the first conductive structure 1050 may be configured to pass through the fourth through-hole 1064 formed through the ground 1011, and to be electrically connected to the second conductive patch 1022. In this case, the second portion 1052 may be configured to only pass through the ground 1011, and not to be electrically connected to the ground 1011.

According to an embodiment, the wireless communication circuit 402 may be configured to control the switch circuit 1053 so as to selectively connect the first tuning circuit 431 to the first conductive patch 1021 or the second conductive patch 1022. In an embodiment, when the first tuning circuit 431 and the first conductive patch 1021 are electrically connected, the wireless communication circuit 402 may be configured to feed the first conductive patch 1021 to transmit and/or receive a signal of the first frequency band. In an embodiment, when the first tuning circuit 431 and the second conductive patch 1022 are electrically connected, the wireless communication circuit 402 may be configured to feed the second conductive patch 1022 to transmit and/or receive a signal of the second frequency band. For example, the first frequency band may be a relatively higher frequency band than the second frequency band.

Figure 11:
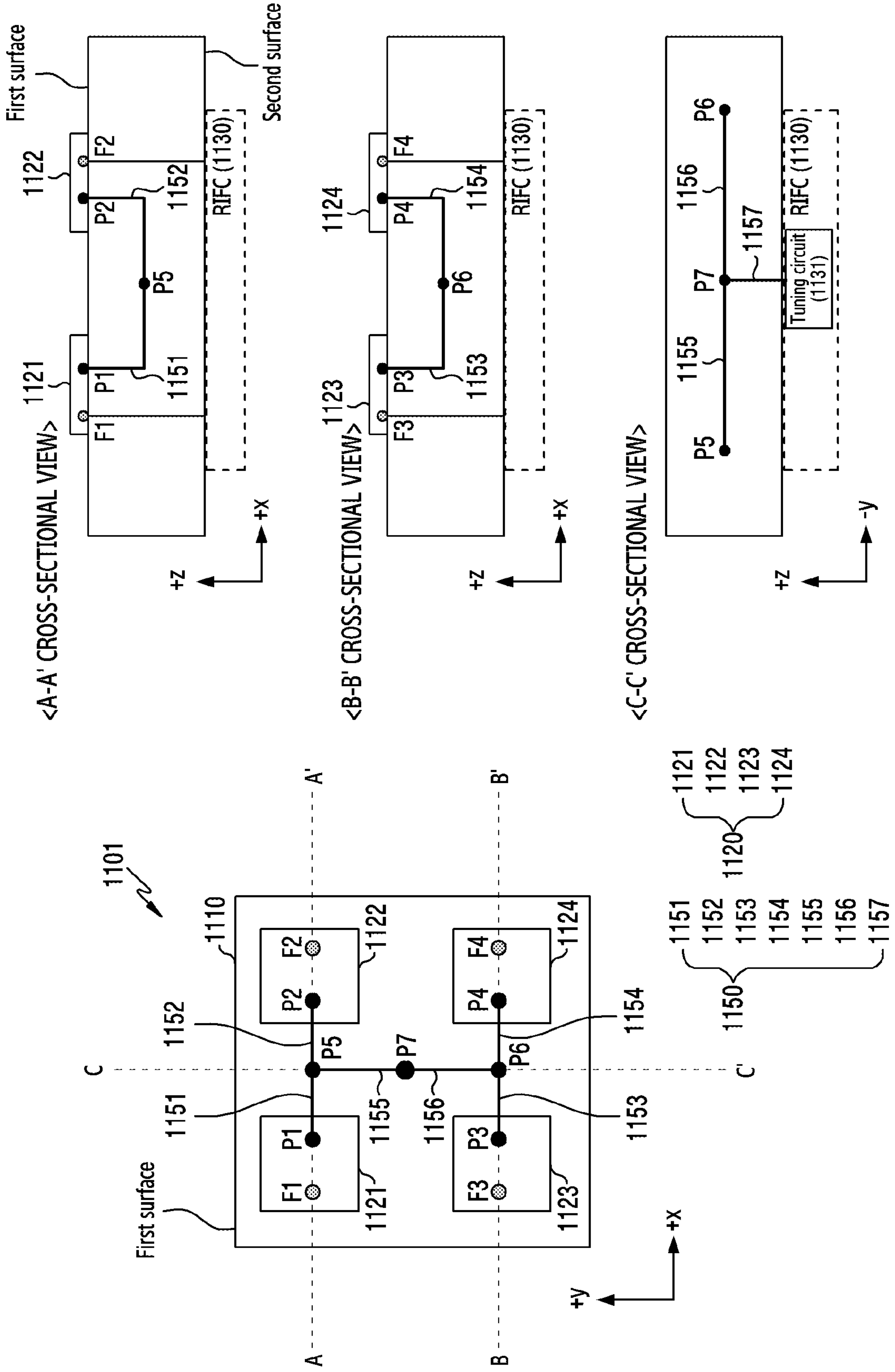
FIG. 11 includes views showing an example conductive structure configured to connect a plurality of conductive patches having a 2×2 antenna array according to various embodiments.

FIG. 11 are views showing an example conductive structure configured to connect a plurality of conductive patches having a 2×2 antenna array according to various embodiments.

Referring to FIG. 11, an antenna module 1101 according to an embodiment may include a printed circuit board 1110, and a plurality of conductive patches 1120 may be disposed on a first surface of the printed circuit board 1110. For example, the printed circuit board 1110 may have a first conductive patch 1121, a second conductive patch 1122, a third conductive patch 1123, and/or a fourth conductive patch 1124 which are disposed thereon. For example, the plurality of conductive patches 1120 may be configured to form a 2×2 antenna array.

According to an embodiment, an RFIC 1130 may be disposed on a second surface of the printed circuit board 1110, and the wireless communication circuit 402 may be configured to control the RFIC 1130 so as to feed a plurality of conductive patches 1120, thereby transmitting and/or receiving a signal in a designated frequency band. For example, the wireless communication circuit 402 may be configured to feed the first conductive patch 1121 at a first feeding point F1 thereof, feed the second conductive patch 1122 at a second feeding point F2 thereof, feed the third conductive patch 1123 at a third feeding point F3 thereof, and feed the fourth conductive patch 1124 at a fourth feeding point F4 thereof. In an example, the wireless communication circuit 402 may be configured to transmit and/or receive a signal in a designated frequency band, based on the feedings.

According to an embodiment, a conductive structure 1150 may be configured to connect the plurality of conductive patches 1120 to one tuning circuit 1131. In an embodiment, referring to the A-A' cross-sectional view, the conductive structure 1150 may include a first portion 1151 configured to extend from the first point P1 of the first conductive patch 1121, and a second portion 1152 configured to extend from the second point P2 of the second conductive patch 1122. The first portion 1151 and the second portion 1152 may be connected at the fifth point P5. In an embodiment, referring to the B-B' cross-sectional view, the conductive structure 1150 may include a third portion 1153 configured to extend from the third point P3 of the third conductive patch 1123, and a fourth portion 1154 configured to extend from the fourth point P4 of the fourth conductive patch 1124. The third portion 1153 and the fourth portion 1154 may be connected at the sixth point P6. In an embodiment, referring to the C-C' cross-sectional view, the conductive structure 1150 may include a first common portion 1155 configured to extend from the fifth point P5 to which the first portion 1151 and the second portion 1152 are connected, a second common portion 1156 configured to extend from the sixth point P6 to which the third portion 1153 and the fourth portion 1154 are connected, and a third common portion 1157 connected to the tuning circuit 1131 (e.g., the first tuning circuit 431 of FIG. 4) from the seventh point P7 to which the first common portion 1155 and the second common portion 1156 are connected.

According to an embodiment, the plurality of conductive patches 1120 may be electrically connected to the tuning circuit 1131 through one conductive path which is the third common portion 1157 of the conductive structure 1150. For example, the tuning circuit 1131 may be used as a common tuning circuit for the plurality of conductive patches 1120, and the RFIC 1130 may include the tuning circuit 1131 as a common tuning circuit of the plurality of conductive patches 1120 so as to reduce the size thereof.

Figure 12:
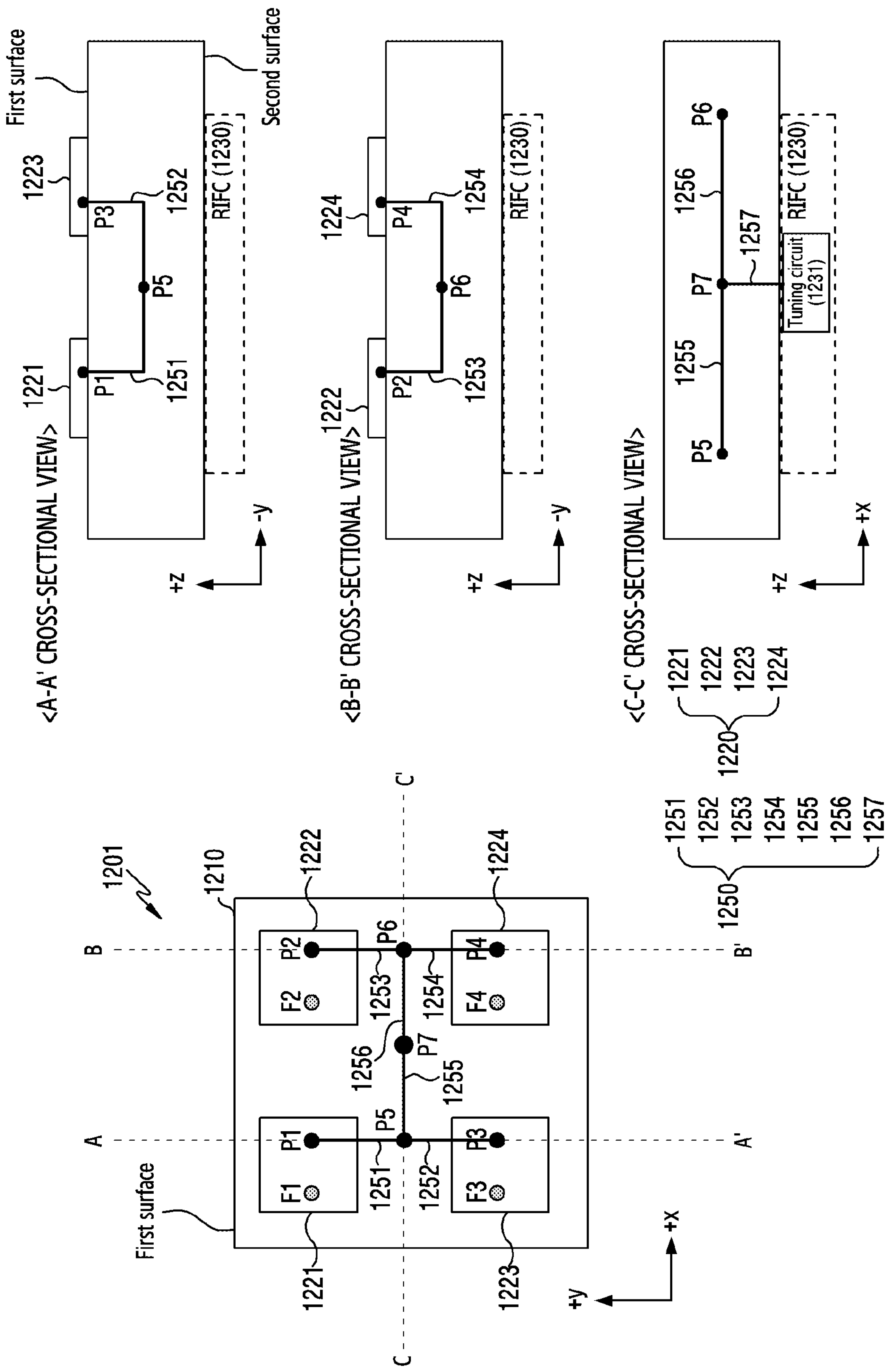
FIG. 12 includes views showing an example conductive structure configured to connect a plurality of conductive patches having a 2×2 antenna array according to various embodiments.

FIG. 12 are views showing a conductive structure configured to connect a plurality of conductive patches having a 2×2 antenna array according to various embodiments.

Referring to FIG. 12, an antenna module 1201 according to an embodiment may include a printed circuit board 1210, and a plurality of conductive patches 1220 may be disposed on the printed circuit board 1210. For example, the printed circuit board 1210 may have a first conductive patch 1221, a second conductive patch 1222, a third conductive patch 1223, and/or a fourth conductive patch 1224 which are disposed on a first surface thereon. For example, the plurality of conductive patches 1220 may be configured to form a 2×2 antenna array.

According to an embodiment, an RFIC 1230 may be disposed on a second surface of the printed circuit board 1210, and the wireless communication circuit 402 may be configured to control the RFIC 1230 so as to feed a plurality of conductive patches 1220, thereby transmitting and/or receiving a signal in a designated frequency band. For example, the wireless communication circuit 402 may be configured to feed the first conductive patch 1221 at a first feeding point F1 thereof, feed the second conductive patch 1222 at a second feeding point F2 thereof, feed the third conductive patch 1223 at a third feeding point F3 thereof, and feed the fourth conductive patch 1224 at a fourth feeding point F4 thereof. In an example, the wireless communication circuit 402 may be configured to transmit and/or receive a signal in a designated frequency band, based on the feedings.

According to an embodiment, a conductive structure 1250 may be configured to connect the plurality of conductive patches 1220 to one tuning circuit 1231. In an embodiment, referring to the A-A' cross-sectional view, the conductive structure 1250 may include a first portion 1251 configured to extend from the first point P1 of the first conductive patch 1221, and a second portion 1252 configured to extend from the third point P3 of the third conductive patch 1223. The first portion 1251 and the second portion 1252 may be connected at the fifth point P5. In an embodiment, referring to the B-B' cross-sectional view, the conductive structure 1250 may include a third portion 1253 configured to extend from the second point P2 of the second conductive patch 1222, and a fourth portion 1254 configured to extend from the fourth point P4 of the fourth conductive patch 1224. The third portion 1253 and the fourth portion 1254 may be connected at the sixth point P6. In an embodiment, referring to the C-C' cross-sectional view, the conductive structure 1250 may include a first common portion 1255 configured to extend from the fifth point P5 to which the first portion 1251 and the second portion 1252 are connected, a second common portion 1256 configured to extend from the sixth point P6 to which the third portion 1253 and the fourth portion 1254 are connected, and a third common portion 1257 connected to the tuning circuit 1231 from the seventh point P7 to which the first common portion 1255 and the second common portion 1256 are connected.

According to an embodiment, the plurality of conductive patches 1220 may be electrically connected to the tuning circuit 1231 through one conductive path which is the third common portion 1257 of the conductive structure 1250. For example, the tuning circuit 1231 may be used as a common tuning circuit for the plurality of conductive patches 1220, and the RFIC 1230 may include the tuning circuit 1231 as a common tuning circuit of the plurality of conductive patches 1220 so as to reduce the size thereof.

Figure 13:
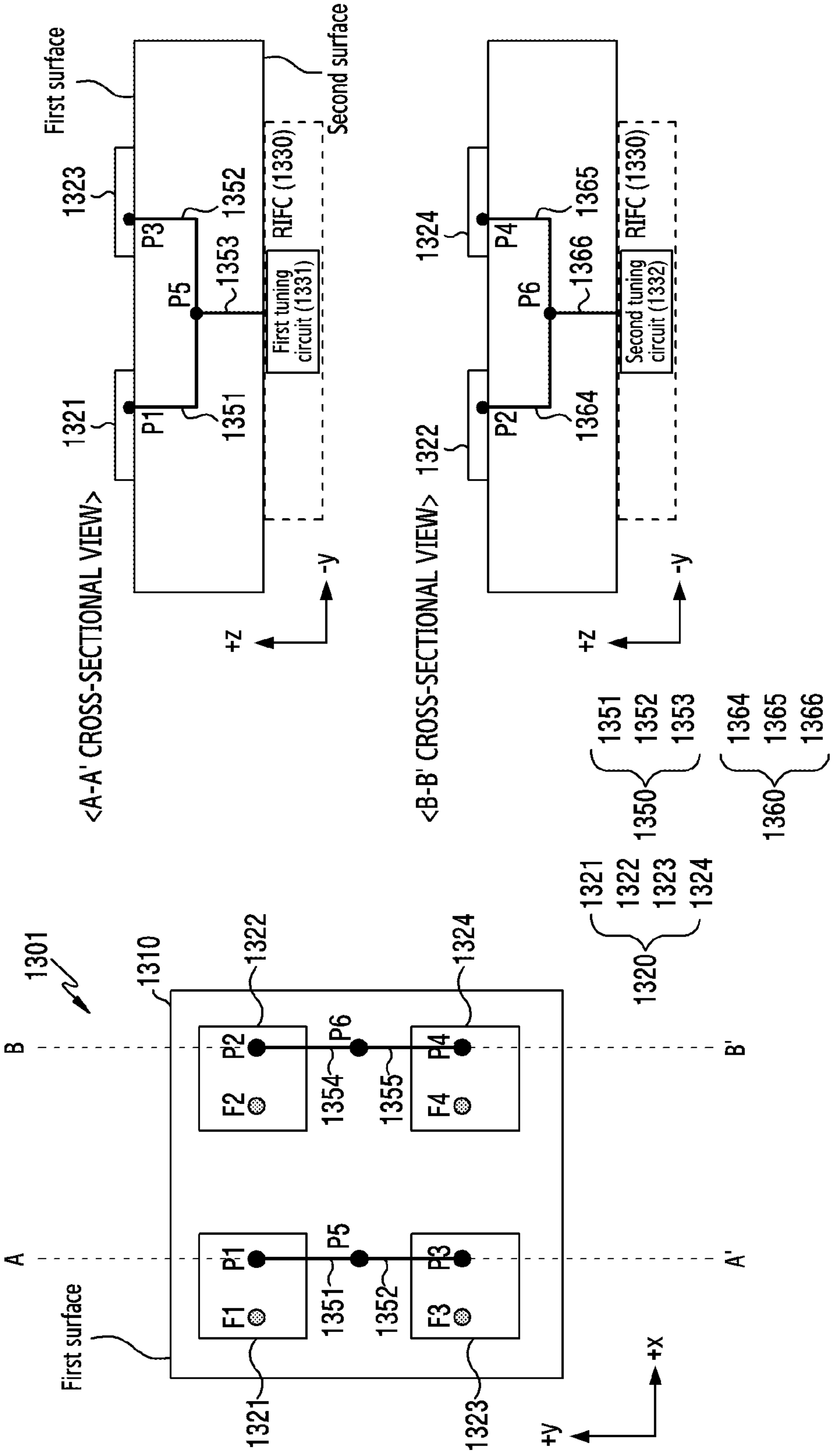
FIG. 13 are views showing an example conductive structure configured to connect a plurality of conductive patches having a 2×2 antenna array according to various embodiments.

FIG. 13 are views showing a conductive structure configured to connect a plurality of conductive patches having a 2×2 antenna array according to various embodiments.

Referring to FIG. 13, an antenna module 1301 according to an embodiment may include a printed circuit board 1310, and a plurality of conductive patches 1320 may be disposed on the printed circuit board 1310. For example, the printed circuit board 1310 may have a first conductive patch 1321, a second conductive patch 1322, a third conductive patch 1323, and/or a fourth conductive patch 1324 which are disposed on a first surface thereon. For example, the plurality of conductive patches 1320 may be configured to form a 2×2 antenna array.

According to an embodiment, an RFIC 1330 may be disposed on a second surface of the printed circuit board 1310, and the wireless communication circuit 402 may be configured to control the RFIC 1330 so as to feed a plurality of conductive patches 1320, thereby transmitting and/or receiving a signal in a designated frequency band. For example, the wireless communication circuit 402 may be configured to feed the first conductive patch 1321 at a first feeding point F1 thereof, feed the second conductive patch 1322 at a second feeding point F2 thereof, feed the third conductive patch 1323 at a third feeding point F3 thereof, and feed the fourth conductive patch 1324 at a fourth feeding point F4 thereof. In an example, the wireless communication circuit 402 may be configured to transmit and/or receive a signal in a designated frequency band, based on the feedings.

According to an embodiment, a first conductive structure 1350 and/or a second conductive structure 1360 may be configured to electrically connect the plurality of conductive patches 1320 to one first tuning circuit 1331. In an embodiment, referring to the A-A' cross-sectional view, the first conductive structure 1350 may include a first portion 1351 configured to extend from the first point P1 of the first conductive patch 1321, a second portion 1352 configured to extend from the third point P3 of the third conductive patch 1323 and connected to the first portion 1351 at the fifth point P5, and a first common portion 1353 configured to extend from the fifth point P5 and connected to the first tuning circuit 1331. For example, the first conductive structure 1350 may be configured to electrically connect the first conductive patch 1321 and the third conductive patch 1323 to one first tuning circuit 1331.

In an embodiment, referring to the B-B' cross-sectional view, the second conductive structure 1360 may include a fourth portion 1364 configured to extend from the second point P2 of the second conductive patch 1322, a fifth portion 1365 configured to extend from the fourth point P4 of the fourth conductive patch 1324 and connected to the fourth portion 1364, and a second common portion 1366 configured to extend from the sixth point P6 and connected to the second tuning circuit 1332. For example, the second conductive structure 1360 may be configured to electrically connect the second conductive patch 1322 and the fourth conductive patch 1324 to one second tuning circuit 1332.

According to an embodiment, first conductive patch 1321 and the third conductive patch 1323 may be electrically connected to the first tuning circuit 1331 through one conductive path which is the firth common portion 1353. The second conductive patch 1322 and the fourth conductive patch 1324 may be electrically connected to the second tuning circuit 1332 through one conductive path which is the second common portion 1366.

For example, the first tuning circuit 1331 and/or the second tuning circuit 1332 may be used as a common tuning circuit for the plurality of conductive patches 1220 so as to reduce the size of the RFIC 1230.

An electronic device 101 according to various embodiments may include an antenna module 401 including a printed circuit board 410 which includes a first surface and a second surface opposite to the first surface, a plurality of conductive patches 420 which include a first conductive patch 421 and a second conductive patch 422 and are disposed on the first surface of the printed circuit board 410, a radio frequency integrated circuit (RFIC) 430 which includes a first tuning circuit 431 and is disposed on the second surface of the printed circuit board 410, and a first conductive structure 450 which includes a first portion 451 configured to extend from a first point P1 of the first conductive patch 421, a second portion 452 configured to extend from a second point P2 of the second conductive patch 422 and connected to the first portion 451 at a third point P3 positioned at one end of the first portion 451, and a first common portion 453 configured to extend from the third point P3 and connected to the first tuning circuit 341, and is configured to connect the first conductive patch 421 and the second conductive patch 422 to the first tuning circuit 431, a ground 510 electrically connected to the first tuning circuit 431, and a wireless communication circuit 402 electrically connected to the plurality of conductive patches 420, wherein the wireless communication circuit 402 may be configured to feed the plurality of conductive patch 420 so as to transmit and/or receive a signal in a designated frequency band.

According to an embodiment, the first tuning circuit may include a phase shifter, and the phase shifter is configured to adjust the phase of signals which the plurality of conductive patches transmit and/or receive.

According to an embodiment, the wireless communication circuit may be configured to control the first tuning circuit such that the first tuning circuit has a designated impedance corresponding to the designated frequency band and connects the plurality of conductive patches and the ground.

According to an embodiment, the plurality of conductive patches may further include a third conductive patch and a fourth conductive patch, and the RFIC may further include a second tuning circuit electrically connected to the third conductive patch and the fourth conductive patch.

According to an embodiment, the antenna module may further include a second conductive structure configured to electrically connect the third conductive patch and the fourth conductive patch to the second tuning circuit, and the second conductive structure may include a third portion configured to extend from the third conductive patch, a fourth portion configured to extend from the fourth conductive patch and connected to one end of the third portion, and a second common portion configured to extend from a fourth point at which the third portion and the fourth portion are joined, and connected to the second tuning circuit.

According to an embodiment, the plurality of conductive patches may be configured to form a 1×4 antenna array.

According to an embodiment, the printed circuit board may include a plurality of conductive layers, and the ground may be formed on a first layer among the plurality of conductive layers.

The electronic device according to an embodiment may include a frame configured to form at least a part of the side surface of the electronic device, and the first surface of the printed circuit board, on which the plurality of conductive patches are arranged, may be configured to face a first side surface of the electronic device, which is formed by the frame.

According to an embodiment, the designated frequency band may include a frequency band of 33-36 GHz.

According to an embodiment, the first portion and the second portion of the first conductive structure may be configured to have a substantially identical electrical length.

According to an embodiment, the first tuning circuit may include a varactor, and the wireless communication circuit may be configured to control, using the varactor, the first tuning circuit such that the first tuning circuit has an impedance corresponding to the designated frequency band.

According to an embodiment, the antenna module may further include a first connection path configured to connect the RFIC and the first conductive patch, and a second connection path configured to connect the RFIC and the second conductive patch, and the wireless communication circuit may be configured to control the RFIC so as to feed the first conductive patch through the first connection path and feed the second conductive patch through the second connection path.

According to an embodiment, the printed circuit board may include a first layer, the first portion of the first conductive structure may include a first via part configured to extend in a first direction from the first surface toward the second surface of the printed circuit board from the first point of the first conductive patch, and a first wiring part configured to extend from the first via part and formed on the first layer of the printed circuit board, and the second portion of the first conductive structure may include a second via part configured to extend in the first direction from the second point of the second conductive patch, and a second wiring part configured to extend from the second via part and formed on the first layer of the printed circuit board, and the second wiring part may be connected to the first wiring part at the third point.

According to an embodiment, the printed circuit board may further include a second layer, the first common portion of the first conductive structure may include a third via part configured to extend from the third point in the first direction, a third wiring part configured to extending from the third via part and formed on the second layer of the printed circuit board, and a fourth via part configured to extend from the third wiring part in the first direction and connected to the first tuning circuit.

An antenna module 401 according to various embodiments disclosed in the document may include a printed circuit board 410 which includes a ground 510 and includes a first surface and a second surface opposite to the first surface, a plurality of conductive patches 420 which include a first conductive patch 421 and a second conductive patch 422 and are arranged on the first surface of the printed circuit board 410, a radio frequency integrated circuit (RFIC) 430 which is disposed on the second surface of the printed circuit board 410 and includes a first tuning circuit 431, a first conductive structure 450 which includes a first portion 451 configured to extend from a first point P1 of the first conductive patch 421, a second portion 452 configured to extend from a second point P2 of the second conductive patch 422 and connected to one end of the first portion 451, and a first common portion 453 configured to extend from a third point P3 at which the first portion 451 and the second portion 452 are connected and connected to the first tuning circuit 431, and is configured to connect the first tuning circuit 431 and the plurality of conductive patches 420, and a wireless communication circuit 402 electrically connected to the plurality of conductive patches 420 and arranged on the second surface of the printed circuit board 410, wherein the first tuning circuit 431 may be electrically connected to the ground 510 of the printed circuit board 410, and the wireless communication circuit 402 may be configured feed the plurality of conductive patches 420 to transmit and/or receive a signal of the designated frequency band.

An electronic device 101 according to various embodiments disclosed in the document may include an antenna module 401 including a printed circuit board 410 which includes a first surface and a second surface opposite to the first surface, a plurality of conductive patches 420 which include a first conductive patch 421 and a second conductive patch 422 and are arranged on the first surface of the printed circuit board 410, a radio frequency integrated circuit (RFIC) 430 which includes a first tuning circuit 431 and is disposed on the second surface of the printed circuit board 410, a switch circuit 953 including a first port T1, a second port T2, and a third port T3, a first conductive structure 950 which includes a first portion 951 configured to extend from the first conductive patch 421 and connected to the first port T1 of the switch circuit 953, a second portion 952 configured to extend from the second conductive patch 422 and connected to the second port T2 of the switch circuit 953, and a common portion 954 configured to connect the third port T3 of the switch circuit 953 and the first tuning circuit 431, and is configured to connect the plurality of conductive patches 420 and the first tuning circuit 431, a ground 510 electrically connected to the first tuning circuit 431, and a wireless communication circuit 402 electrically connected to the plurality of conductive patches 420, wherein the wireless communication circuit 402 may be configured to feed the plurality of conductive patch 420 to transmit and/or receive a signal in a designated frequency band.

According to an embodiment, the tuning circuit may include a phase shifter, and the phase shifter may be configured to adjust the phase of signals which the plurality of conductive patches transmit and/or receive.

According to an embodiment, the wireless communication circuit may be configured to control the tuning circuit such that the tuning circuit has a designated impedance corresponding to the designated frequency band and connects the plurality of conductive patches and the ground.

According to an embodiment, the switch circuit may include a single pole double through (SPDT) switch.

According to an embodiment, the antenna module may further include a first connection path configured to connect the RFIC and the first conductive patch, and a second connection path configured to connect the RFIC and the second conductive patch, and the wireless communication circuit may be configured to control the RFIC to feed the first conductive patch through the first connection path and feed the second conductive patch through the second connection path.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

an antenna module comprising:

a printed circuit board comprising a first surface and a second surface opposite to the first surface, the printed circuit board including a conductive layer corresponding to a ground, a plurality of conductive patches disposed in the printed circuit board or on the first surface of the printed circuit board, and comprising a first conductive patch and a second conductive patch, a radio frequency integrated circuit (RFIC) disposed on the second surface of the printed circuit board, and comprising a first tuning circuit electrically connected with the conductive layer corresponding to the ground, and a first conductive structure connecting the first conductive patch and the second conductive patch to the first tuning circuit, the first conductive structure comprising:

a first portion extending from a first point of the first conductive patch, a second portion extending from a second point of the second conductive patch and connected to one end of the first portion, and a first common portion extending from a third point at which the first portion and the second portion are connected, and connected to the first tuning circuit;

and a communication processor electrically connected with the RFIC, wherein the communication processor is configured to control the RFIC to feed power to the plurality of conductive patches to transmit and/or receive a signal of a designated frequency band, and wherein the first tuning circuit electrically connects the plurality of conductive patches and the conductive layer with a designated impedance corresponding to the designated frequency band.

2. The electronic device of claim 1, wherein the first tuning circuit comprises a phase shifter, and wherein the phase shifter is configured to adjust phases of signals which the plurality of conductive patches transmit and/or receive.

3. The electronic device of claim 1, wherein the communication processor is configured to control the first tuning circuit such that the first tuning circuit has the designated impedance.

4. The electronic device of claim 1, wherein the plurality of conductive patches further comprises a third conductive patch and a fourth conductive patch, and wherein the RFIC further comprises a second tuning circuit electrically connected to the third conductive patch and the fourth conductive patch.

5. The electronic device of claim 4, wherein the antenna module further comprises a second conductive structure electrically connecting the third conductive patch and the fourth conductive patch to the second tuning circuit, and wherein the second conductive structure comprises:

a third portion extending from the third conductive patch, a fourth portion extending from the fourth conductive patch and connected to one end of the third portion, and a second common portion extending from a fourth point at which the third portion and the fourth portion are connected, and connected to the second tuning circuit.

6. The electronic device of claim 4, wherein the plurality of conductive patches is configured to form a 1×4 antenna array.

7. The electronic device of claim 1, wherein the printed circuit board comprises a plurality of conductive layers, and wherein the plurality of conductive layers comprises the conductive layer corresponding to the ground.

8. The electronic device of claim 1, further comprising:

a frame forming at least a part of a side surface of the electronic device, wherein the first surface of the printed circuit board is configured to face a first side surface of the electronic device which is formed by the frame.

9. The electronic device of claim 1, wherein the designated frequency band comprises a frequency band of 33-36 GHz.

10. The electronic device of claim 1, wherein the first portion and the second portion of the first conductive structure are configured to have a substantially identical electrical length.

11. The electronic device of claim 1, wherein the first tuning circuit comprises a varactor, and wherein the communication processor is configured to control, using the varactor, the first tuning circuit such that the first tuning circuit has the designated impedance corresponding to the designated frequency band.

12. The electronic device of claim 1, wherein the antenna module further comprises:

a first connection path connecting the RFIC and the first conductive patch; and a second connection path connecting the RFIC and the second conductive patch, and wherein the communication processor is configured to control the RFIC to:

feed power to the first conductive patch through the first connection path; and feed power to the second conductive patch through the second connection path.

13. The electronic device of claim 1, wherein the printed circuit board comprises a first conductive layer, wherein the first portion of the first conductive structure comprises:

a first via part extending in a first direction from the first surface toward the second surface of the printed circuit board from the first point of the first conductive patch; and a first wiring part extending from the first via part and formed on the first conductive layer of the printed circuit board, and wherein the second portion of the first conductive structure comprises:

a second via part extending in the first direction from the second point of the second conductive patch; and a second wiring part extending from the second via part and formed on the first conductive layer of the printed circuit board, the second wiring part being connected to the first wiring part at the third point.

14. The electronic device of claim 13, wherein the printed circuit board further comprises a second conductive layer, and wherein the first common portion of the first conductive structure comprises:

a third via part extending in the first direction from the third point;

a third wiring part extending from the third via part and formed on the second conductive layer of the printed circuit board; and a fourth via part extending in the first direction from the third wiring part and connected to the first tuning circuit.

15. An antenna module comprising:

a printed circuit board comprising a first surface and a second surface opposite to the first surface, the printed circuit board including a conductive layer corresponding to a ground;

a plurality of conductive patches disposed in the printed circuit board or on the first surface of the printed circuit board, and comprising a first conductive patch and a second conductive patch;

a radio frequency integrated circuit (RFIC) disposed on the second surface of the printed circuit board, and comprising a first tuning circuit electrically connected with the conductive layer corresponding to the ground; and a first conductive structure connecting the first tuning circuit and the plurality of conductive patches, the first conductive structure comprising:

a first portion extending from a first point of the first conductive patch, a second portion extending from a second point of the second conductive patch and connected to one end of the first portion, and a first common portion extending from a third point at which the first portion and the second portion are connected and connected to the first tuning circuit, wherein the RFIC is configured to feed power to the plurality of conductive patches to transmit and/or receive a signal of a designated frequency band, and wherein the first tuning circuit electrically connects the plurality of conductive patches and the conductive layer with a designated impedance corresponding to the designated frequency band.

16. An electronic device comprising:

an antenna module comprising:

a printed circuit board comprising a first surface and a second surface opposite to the first surface, the printed circuit board including a conductive layer corresponding to a ground, a plurality of conductive patches disposed on the first surface of the printed circuit board, and comprising a first conductive patch and a second conductive patch, a radio frequency integrated circuit (RFIC) disposed on the second surface of the printed circuit board, and comprising a tuning circuit electrically connected with the conductive layer corresponding to the ground, and a conductive structure configured to connect the plurality of conductive patches and the tuning circuit, the conductive structure comprising:

a switch circuit comprising a first port, a second port, and a third port, a first portion extending from the first conductive patch and connected to the first port of the switch circuit, a second portion extending from the second conductive patch and connected to the second port of the switch circuit, and a common portion connecting the third port of the switch circuit and the tuning circuit;

and a communication processor electrically connected with the RFIC, wherein the communication processor is configured to control the RFIC to feed power to the plurality of conductive patches to transmit and/or receive a signal of a designated frequency band, and wherein the tuning circuit electrically connects the plurality of conductive patches and the conductive layer with a designated impedance corresponding to the designated frequency band.

17. The electronic device of claim 16, wherein the tuning circuit comprises a phase shifter, and wherein the phase shifter is configured to adjust the phases of signals which the plurality of conductive patches transmit and/or receive.

18. The electronic device of claim 16, wherein the communication processor is configured to control the tuning circuit such that the tuning circuit has the designated impedance.

19. The electronic device of claim 16, wherein the switch circuit comprises a single pole double through (SPDT) switch.

20. The electronic device of claim 16, wherein the antenna module further comprises:

a first connection path configured to connect the RFIC and the first conductive patch; and a second connection path configured to connect the RFIC and the second conductive patch, and wherein the communication processor is configured to control the RFIC to:

feed power to the first conductive patch through the first connection path; and feed power to the second conductive patch through the second connection path.

* * * * *